United States Patent
Takeda et al.

(10) Patent No.: US 11,770,831 B2
(45) Date of Patent: Sep. 26, 2023

(54) USER TERMINAL AND RADIO COMMUNICATION METHOD

(71) Applicant: NTT DOCOMO, INC., Tokyo (JP)

(72) Inventors: Kazuki Takeda, Tokyo (JP); Satoshi Nagata, Tokyo (JP); Lihui Wang, Beijing (CN); Xiaolin Hou, Beijing (CN)

(73) Assignee: NTT DOCOMO, INC., Tokyo (JP)

( * ) Notice: Subject to any disclaimer, the term of this patent is extended or adjusted under 35 U.S.C. 154(b) by 54 days.

(21) Appl. No.: 16/635,366

(22) PCT Filed: Aug. 1, 2017

(86) PCT No.: PCT/JP2017/027937
§ 371 (c)(1),
(2) Date: Jan. 30, 2020

(87) PCT Pub. No.: WO2019/026188
PCT Pub. Date: Feb. 7, 2019

(65) Prior Publication Data
US 2021/0092756 A1    Mar. 25, 2021

(51) Int. Cl.
*H04W 72/21* (2023.01)
*H04L 1/00* (2006.01)

(52) U.S. Cl.
CPC .......... *H04W 72/21* (2023.01); *H04L 1/0013* (2013.01)

(58) Field of Classification Search
None
See application file for complete search history.

(56) References Cited

U.S. PATENT DOCUMENTS

| 2009/0073922 | A1* | 3/2009 | Malladi ............... H04L 1/0072 370/328 |
| 2016/0128045 | A1* | 5/2016 | Azarian Yazdi ...... H04W 72/20 370/330 |
| 2019/0021112 | A1 | 1/2019 | Harada et al. |
| 2020/0136750 | A1* | 4/2020 | Baldemair ........... H04L 1/1664 |

(Continued)

FOREIGN PATENT DOCUMENTS

JP    2017130796 A    7/2017

OTHER PUBLICATIONS

Extended European Search Report issued in European Application No. 17920470.6, dated Jan. 12, 2021 (7 pages).

(Continued)

*Primary Examiner* — Lonnie V Sweet
(74) *Attorney, Agent, or Firm* — Osha Bergman Watanabe & Burton LLP

(57) ABSTRACT

In order to suppress deterioration of the communication quality also in the case of transmitting uplink data and uplink control information using an uplink shared channel in the future radio communication system, one aspect of a user terminal of the present invention has a transmitting section that transmits uplink data and uplink control information, and a control section that controls so as to select one of puncturing processing and rate matching processing to apply to the uplink data, based on an indication from a base station and/or a predetermined condition, in the case of multiplexing the uplink data and the uplink control information into an uplink shared channel to transmit.

5 Claims, 10 Drawing Sheets

(56) References Cited

U.S. PATENT DOCUMENTS

2022/0131643 A1* 4/2022 Park ................ H04W 72/0413

OTHER PUBLICATIONS

3GPP TS 36.300 V8.12.0; "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 8)" Mar. 2010 (149 pages).
3GPP TSG RAN WG1 NR Ad-Hoc #2; R1-1710952; "Considerations on UCI transmission on PUSCH" InterDigital Inc.; Qingdao, P.R. China; Jun. 27-20, 2017 (4 pages).
3GPP TSG RAN WG1 NR Ad-Hoc #2; R1-1710320; "Support of UCI piggyback on PUSCH for NR" LG Electronics; Qingdao, P.R. China; Jun. 27-30, 2017 (5 pages).
International Search Report issued in International Application No. PCT/JP2017/027937, dated Sep. 12, 2017 (3 pages).
Written Opinion issued in International Application No. PCT/JP2017/027937; dated Sep. 12, 2017 (3 pages).
Office Action issued in Japanese Application No. 2019-533784; dated Jun. 1, 2021 (10 pages).
Office Action issued in Indian Application No. 202037004505; dated Mar. 11, 2022 (6 pages).
Office Action issued in counterpart Chinese Patent Application No. 201780095225.1 dated Dec. 20, 2022 (16 pages).

\* cited by examiner

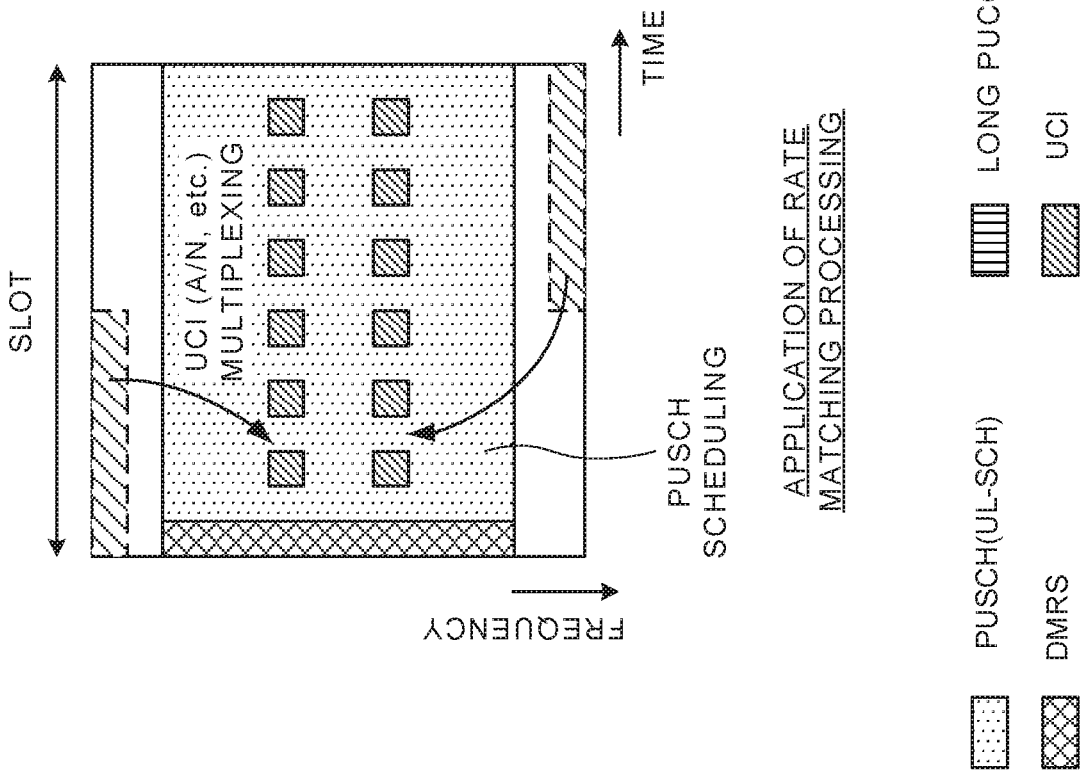
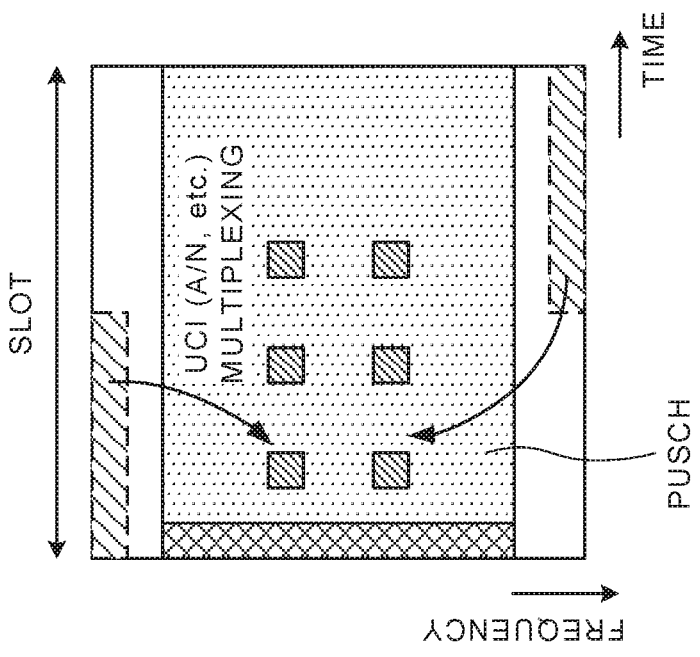

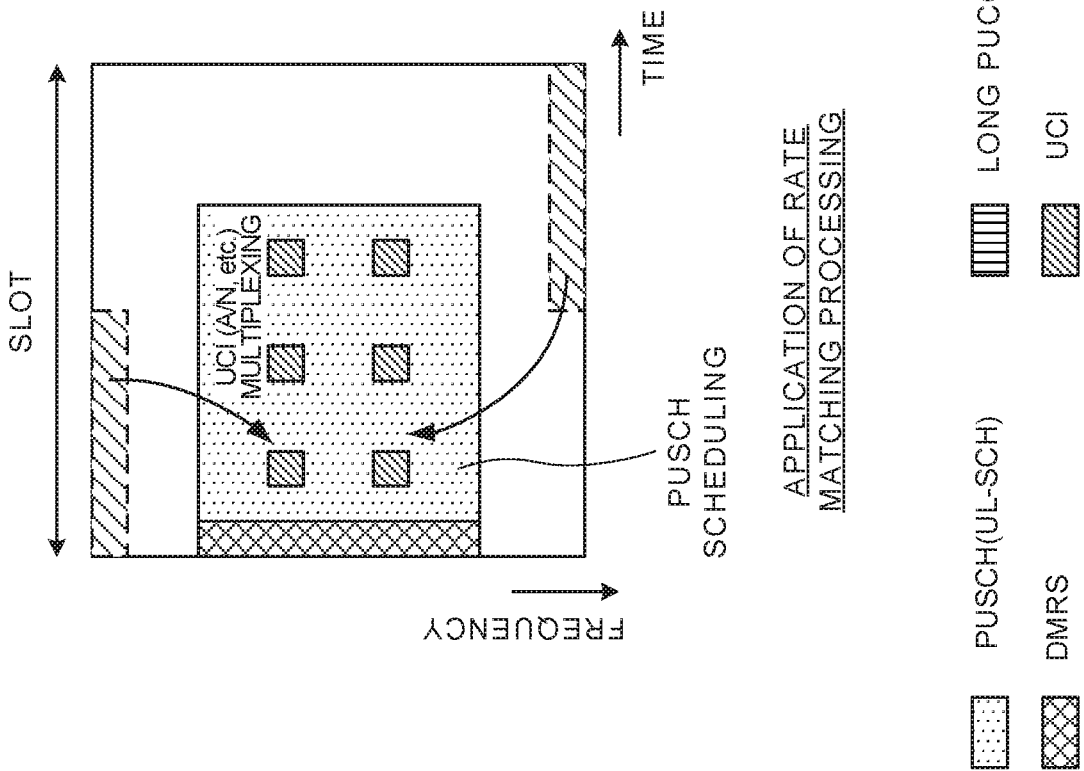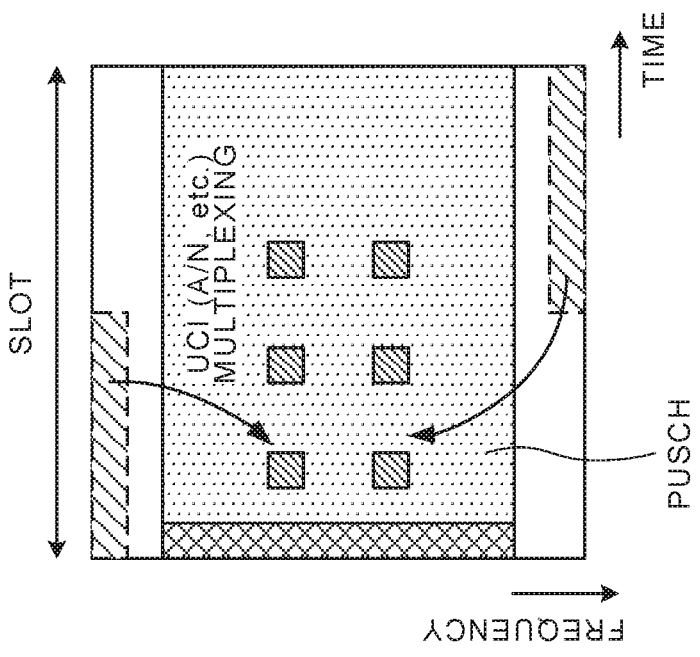

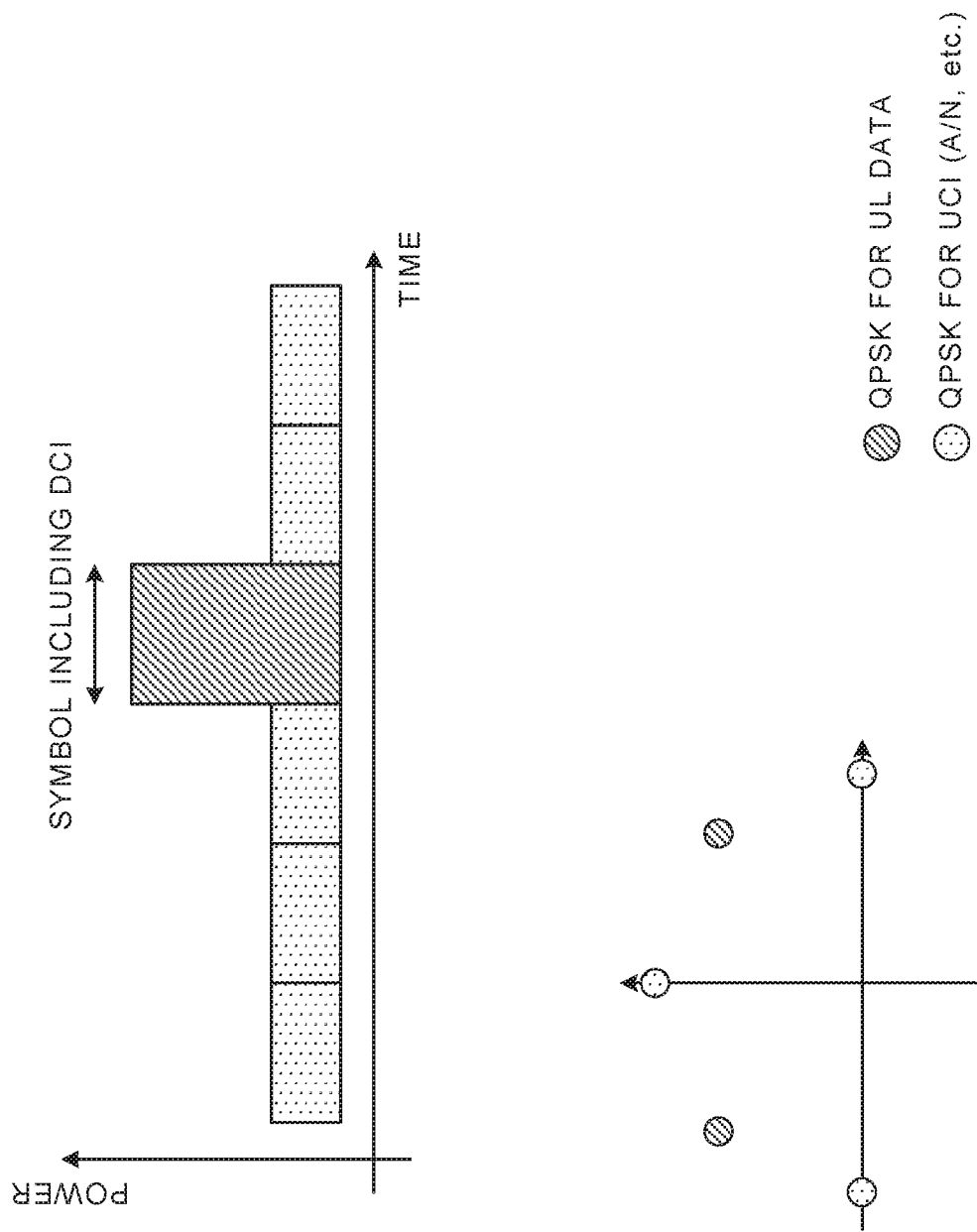

USER TERMINAL AND RADIO COMMUNICATION METHOD

TECHNICAL FIELD

The present invention relates to a user terminal and radio communication method in the next-generation mobile communication system.

BACKGROUND ART

In UMTS (Universal Mobile Telecommunications System) networks, for the purpose of higher data rates, low delay and the like, Long Term Evolution (LTE) has been specified (Non-patent Document 1). Further, for the purpose of wider bands and higher speed than LTE, successor systems (e.g., also referred to as LTE-A (LTE-Advanced), FRA (Future Radio Access), 4G, 5G, 5G+ (plus), NR (New RAT), LTE Rel.14, 15~, etc.) to LTE have also been studied.

On uplink (UL) in the existing LTE system (e.g., LTE Rel.8-13), DFT-s-OFDM (Discrete Fourier Transform-Spread-Orthogonal Frequency Division Multiplexing) waveforms are supported. The DFT-s-OFDM waveform is a single-carrier waveform, and therefore, it is possible to prevent the Peak to Average Power Ratio (PAPR) from increasing.

Further, in the existing LTE system (e.g., LTE Rel.8-13), a user terminal transmits uplink control information (UCI), using a UL data channel (e.g., PUSCH: Physical Uplink Shared Channel) and/or UL control channel (e.g., PUCCH: Physical Uplink Control Channel).

Transmission of the UCI is controlled, based on the presence or absence of configuration of simultaneous PUSCH and PUCCH transmission, and the presence or absence of scheduling of the PUSCH in TTI for transmitting the UCI. Transmission of the UCI using the PUSCH is also called UCI on PUSCH.

PRIOR ART DOCUMENT

Non-Patent Document

[Non-patent Document 1] 3GPP TS 36.300 V8.12.0 "Evolved Universal Terrestrial Radio Access (E-UTRA) and Evolved Universal Terrestrial Radio Access Network (E-UTRAN); Overall description; Stage 2 (Release 8)", April, 2010

DISCLOSURE OF INVENTION

Problems to be Solved by the Invention

In the future radio communication system (e.g., LTE Rel. 14 onward, 5G, NR or the like), it is studied to flexibly control scheduling of data channels (including a DL data channel and/or UL data channel, also simply referred to as data and the like). For example, it is studied to make transmission timing and/or transmission period (hereinafter, also described as "transmission timing/transmission period") of data changeable (variable length) for each scheduling. Further, also for receipt confirmation signals (also called HARQ-ACK, ACK/NACK, A/N) in response to transmission of data, it is studied to make the signal changeable for each transmission.

In addition, in the existing LTE system, in the case where transmission of uplink data (e.g., UL-SCH) overlaps with transmission timing of uplink control information (UCI), transmission of the uplink data and UCI is performed using an uplink shared channel (PUSCH) (UCI on PUSCH). Also in the future radio communication system, as in the existing LTE system, it is considered that transmission of uplink data and UCI (A/N, etc.) is performed using the PUSCH.

However, in the case where transmission timing/transmission period of UL data and/or UCI is varied for each transmission and is controlled as described above, for example, cases may occur where transmission of a plurality of UCI and UL data overlaps with one another, and the like. In other words, in the future radio communication system, as compared with the existing LTE system, the case is expected where the capacity (payload size) of UCI multiplexed into an uplink shared channel is increased. In this case, when UCI on PUSCH is applied as in the existing LTE system, there is the risk that the communication quality deteriorates.

The present invention was made in view of such a respect, and it is an object of the invention to provide a user terminal and radio communication method capable of suppressing deterioration of the communication quality, also in the case of transmitting uplink data and uplink control information using an uplink shared channel in the future radio communication system.

Means for Solving the Problem

One aspect of a user terminal of the present invention is characterized by having a transmitting section that transmits uplink data and uplink control information, and a control section that controls so as to select one of puncturing processing and rate matching processing to apply to the uplink data, based on an indication from a base station and/or a predetermined condition, in the case of multiplexing the uplink data and the uplink control information into an uplink shared channel to transmit.

Advantageous Effect of the Invention

According to the present invention, in the future radio communication system, it is possible to suppress deterioration of the communication quality also in the case of transmitting the uplink data and uplink control information using the uplink shared channel.

BRIEF DESCRIPTION OF DRAWINGS

FIGS. 2A and 2B are diagrams showing another example of the case of multiplexing UL data (UL-SCH) and uplink control information (UCI) into PUSCH;

FIGS. 3A and 3B are diagrams showing still another example of the case of multiplexing UL data (UL-SCH) and uplink control information (UCI) into PUSCH;

FIGS. 4A and 4B are diagrams showing one example of the case of applying different types of processing to UL data (UL-SCH) and uplink control information (UCI) multiplexed into PUSCH;

BEST MODE FOR CARRYING OUT THE INVENTION

Figure 1:
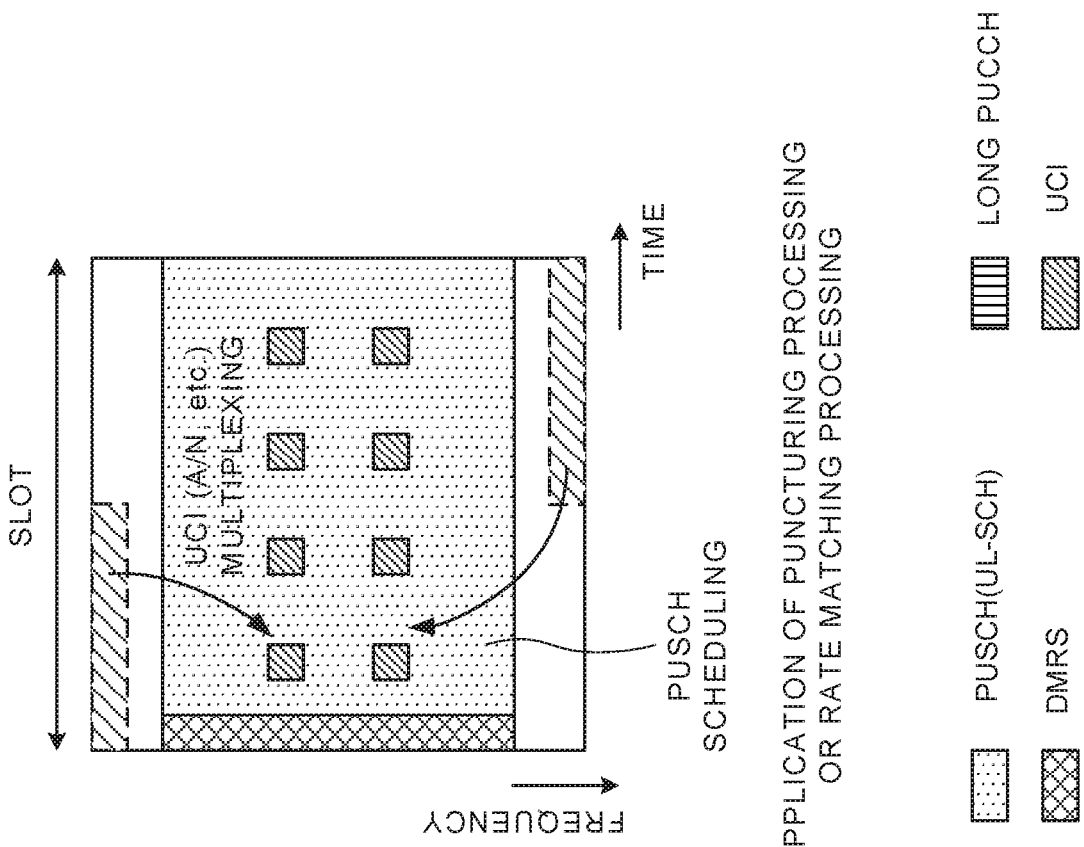
FIG. 1 is a diagram showing one example of the case of multiplexing UL data (UL-SCH) and uplink control information (UCI) into PUSCH.

In the future radio communication system (e.g., LTE Rel. 14 onward, 5G, NR or the like), it is studied to use time units (e.g., at least one of slot, mini slot and the predetermined number of symbols) for enabling respective time lengths to be changeable, as a scheduling unit of data channels (including a DL data channel and/or UL data channel, also simply referred to as data and the like).

Herein, the slot is a time unit based on numerology (e.g., subcarrier spacing and/or symbol length) that a user terminal applies. The number of symbols per slot may be determined, corresponding to the subcarrier spacing. For example, in the case where the subcarrier spacing is 15 kHz or 30 kHz, the number of symbols per slot may be "7" or "14". On the other hand, in the case where the subcarrier spacing is 60 kHz or more, the number of symbols per slot may be "14".

The subcarrier spacing and the symbol length are in the reciprocal relationship. Therefore, when symbols per slot are the same, the slot length is shorter as the subcarrier spacing is higher (wider), while being longer as the subcarrier spacing is lower (narrower).

Further, the mini slot is a time unit shorter than the slot. The mini slot may be comprised of symbols (e.g., 1~(slot length−1) symbols, as one example, 2 or symbols) lower in number than the slot. To mini-slots within a slot, the same numerology (e.g., subcarrier spacing and/or symbol length) as that of the slot may be applied, or numerology (e.g., subcarrier spacing higher than in the slot and/or symbol length shorter than in the slot) different from that of the slot may be applied.

In the future radio communication system, in association with introduction of time units different from those in the existing LTE system, it is expected to control transmission and reception (or, allocation, etc.) of signals and/or channels by applying a plurality of time units to scheduling of data and the like. In the case of performing scheduling of data and the like using different time units, it is considered that a plurality of types of transmission periods/transmission timing and the like of data occurs. For example, a user terminal that supports a plurality of time units performs transmission and reception of data scheduled in different time units.

As one example, it is conceivable to apply scheduling (slot-based scheduling) in a first time unit (e.g., slot basis) and scheduling (non-slot-based scheduling) in a second time unit (e.g., non-slot basis) shorter than the first time unit. The non-slot basis may be a mini slot basis or symbol basis. In addition, for example, it is possible to configure a slot using 7 symbols or 14 symbols, and configure a mini slot using 1~(slot length−1) symbols.

In this case, corresponding to a scheduling unit of data, transmission timing/transmission period of data varies in the time domain. For example, in the case of scheduling on a slot basis, a single item of data is allocated to one slot. On the other hand, in the case of scheduling on a non-slot basis (mini slot basis or symbol basis), data is selectively allocated to a part of regions of one slot. Therefore, in the case of scheduling on a non-slot basis, it is possible to allocate a plurality of items of data to one slot.

Further, in the future radio communication system, in order to flexibly control scheduling of data and the like, it is expected to make transmission timing/transmission period of data and the like changeable for each scheduling (transmission). For example, in non-slot-based scheduling, data (e.g., PDSCH and/or PUSCH) is disposed over the predetermined number of symbols, while starting an allocation position from some symbol for each scheduling.

In the same manner as in the data (e.g., PDSCH and/or PUSCH) such that the transmission timing/transmission period is controlled variably, it is expected to also configure UCI (e.g., A/N) in response to the data so that the transmission timing/transmission period is changeable for each transmission. For example, the base station designates transmission timing/transmission period of the UCI to a UE, using downlink control information and/or higher layer signaling, etc. In this case, A/N feedback timing is flexibly configured in a period after downlink control information for notifying of the transmission timing/transmission period of the A/N and/or corresponding PDSCH.

Thus, in the future radio communication system, it is expected to flexibly configure one or both of the transmission timing/transmission period of A/N in response to DL data and transmission timing/transmission period of PUSCH. On the other hand, in UL transmission, it is also required to achieve low PAPR (Peak-to-Average Power Ratio) and/or low inter-modulation distortion (IMD).

As a method of achieving low PAPR and/or low IMD in UL transmission, in the case where UCI transmission and UL data (UL-SCH) transmission occurs at the same timing, there is a method of multiplexing the UCI and UL data into a PUSCH to transmit (also called UCI piggyback on PUSCH, UCI on PUSCH).

In the existing LTE system, in the case of transmitting UL data and UCI (e.g., A/N) using the PUSCH, the UL data is subjected to puncturing processing, and the UCI is multiplexed into resources subjected to the puncturing processing. This is because the capacity (or, ratio) of the UCI multiplexed into the PUSCH is not so high in the existing LTE system and/or complexity of reception processing is suppressed in the base station also in the case where a mistake in detection of a DL signal occurs in the UE.

Performing the puncturing processing on data refers to that any coded symbol is not mapped to a resource (e.g., resource for UCI) that is not usable actually (the resource is made vacant), while performing coding on the premise that resources allocated to the data are usable (or, without considering a resource amount that is not usable). On the receiving side, by not using the coded symbol of the punctured resource in decoding, it is possible to suppress characteristic deterioration due to puncturing.

Also in the future radio communication system, as in the existing LTE system, it is considered that UCI on PUSCH is performed. However, in the case where transmission timing/transmission period of UL data and/or UCI is varied for each transmission and is controlled as described above, cases may occur where transmission of a plurality of UCI and UL data overlaps with one another, and the like. In other words, in the future radio communication system, as compared with the existing LTE system, the case is expected where the capacity (payload size) of UCI multiplexed into an uplink shared channel is increased.

In this case, when UCI on PUSCH is applied as in the existing LTE system based on the premise that transmission timing/transmission period of data and/or UCI is configured fixedly, there is the risk that the communication quality deteriorates. For example, in the case of applying the puncturing processing to UL data when the payload of UCI multiplexed into the PUSCH is large, there is the risk that coded symbols are not mapped (vacant) to many portions of bit regions to code. In other words, there are many resource portions which are not used in the bit region of coded UL data, and as compared with the case where the payload of UCI is small, there is the risk that the coding rate is lower, and that the communication quality deteriorates.

The inventors of the present invention noted the respect that rate matching processing is applicable to UL data in the case of transmitting the UL data and UCI using a PUSCH, and conceived selecting one of the puncturing processing and the rate matching processing to apply based on a communication condition and the like.

Performing the rate matching processing on data refers to controlling the number of bits (coded bits) subsequent to coding, in consideration of actually usable radio resources. In the case where the number of coded bits is lower than the number of bits capable of being mapped to actually usable resources, at least a part of the coded bits may be repeated. In the case where the number of coded bits is higher than the number of bits capable of being mapped, at least a part of the coded bits may be deleted.

By performing the rate matching processing on UL data, since actually usable resources are considered, as compared with the puncturing processing, it is possible to perform coding so that a coding rate is high (with high performance). Accordingly, for example, in the case where a size of the payload of UCI is large, by applying the rate matching processing as a substitute for the puncturing processing, since it is possible to generate UL signals with higher quality, it is possible to improve the communication quality.

This Embodiment will be described below in detail. In addition, in this Embodiment, the UCI may include at least one of a scheduling request (SR), receipt confirmation information (also referred to as HARQ-ACK: Hybrid Automatic Repeat reQuest-Acknowledge, ACK or NACK (Negative ACK), A/N or the like) in response to a DL data channel (e.g., PDSCH: Physical Downlink Shared Channel), channel state information (CSI: Channel State Information), beam index information (BI: Beam Index) and buffer status report (BSR: Buffer Status Report).

(Aspect 1)

Aspect 1 describes the case where a radio base station notifies a UE of a processing method (puncturing processing or rate matching processing) applied to UL data, when uplink control information (UCI) and the UL data (UL-SCH) is multiplexed into an uplink shared channel (PUSCH). In other words, in Aspect 1, irrespective of a payload size of the UCI and/or the UL data, the UE applies the processing method configured from the base station.

FIG. 1 illustrates the case of performing transmission of UCI using a PUSCH (UCI on PUSCH). As shown in FIG. 1, in a slot where the PUSCH is scheduled, when there is UCI (e.g., A/N, etc.) transmission using a PUCCH allocated over the slot, the UE multiplexes the UCI into the PUSCH to transmit.

In addition, FIG. 1 illustrates the case where the PUSCH is arranged over the slot, but the invention is not limited thereto, and the PUSCH may be scheduled in a region (one or several symbols) of a part of the slot, or over a plurality of slots. Further, FIG. 1 illustrates a DMRS is arranged in a beginning of a region where the PUSCH is allocated, but the position where the DMRS is arranged and/or the number thereof and the like are not limited to thereto.

For example, a second DMRS may be inserted in some midpoint (e.g., 7th symbol, etc.) of the slot. At this point, it is possible to configure a mapping position of the UCI so that the first and second DMRSs do not overlap each other. Alternatively, the mapping position of the UCI is allowed to overlap with any of DMRSs, and in the overlapping resource, one of the UCI and the DMRS may be punctured. In the case of puncturing the UCI, it is possible to maintain channel estimation accuracy of the DMRS, and avoid demodulation performance deterioration of the PUSCH. In the case of puncturing the DMRS, while permitting demodulation performance deterioration of the PUSCH, it is possible to avoid performance deterioration of the UCI. Whether to puncture the UCI or puncture the DMRS may be selected, corresponding to the type of the UCI. For example, in the case where the UCI is HARQ-ACK, the DMRS may be punctured, and in the case where the UCI is CQI, the UCI may be punctured.

The UE applies the processing method configured from the base station to the UL data, and controls allocation of the UCI and UL data to the PUSCH. The base station notifies the UE of whether to apply the puncture processing or the rate matching processing to the DL data. Notification from the base station to the UE may be performed using higher layer signaling and/or physical layer signaling (e.g., downlink control information) and the like. In the case of using the physical layer signaling, it is possible to dynamically control the suitable processing method corresponding to the size or ratio of the UCI multiplexed into the PUSCH.

<Application of the Puncturing Processing>

In the case where the puncturing processing is configured as the processing on the UL data, the UE performs the puncturing processing on the UL data in UCI on PUSCH. Specifically, in the case of multiplexing the UCI into the PUSCH, the UE punctures at least a part of resources for the UL data of the PUSCH, and multiplexes the UCI into the punctured resource.

A resource amount to apply the puncturing processing to multiplex the UCI may be adjusted based on a predetermined condition. The predetermined condition may be at least one of (1) the number of bits of the UCI to multiplex, (2) UL data amount scheduled on the PUSCH, (3) Modulation and Coding Scheme (MCS) and/or coding rate of the UL data, and (4) parameter to adjust the coding rate of the UCI. As a matter of course, the resource amount to puncture may be determined, in consideration of a combination of a part of (1) to (4) or all conditions. In addition, the information of (4) may be information notified the UE by higher layer signaling.

In the case of applying the puncturing processing to the UL data, even when the UE makes a mistake in detection of a DL signal (DCI and/or DL data) that is a generation source of A/N and does not multiplex the UCI, the base station side is capable of suitably performing reception processing. This is because the base station performs reception processing, while assuming that the UL data is punctured, and thereby controls not to use the resource to which A/N should be mapped in demodulation of the UL data.

<Application of the Rate Matching Processing>

In the case where the rate matching processing is configured as the processing on the UL data, the UE performs the rate matching processing on the UL data in UCI on PUSCH. Specifically, in the case of multiplexing the UCI into the PUSCH, the UE performs rate matching on at least a part of resources for the UL data of the PUSCH, and multiplexes the UCI into the resource subjected to rate matching.

A resource amount to apply the rate matching processing to multiplex the UCI may be adjusted based on a predetermined condition. The predetermined condition may be at least one of (1) the number of bits of the UCI to multiplex, (2) UL data amount scheduled on the PUSCH, (3) Modulation and Coding Scheme (MCS) and/or coding rate of the UL data, and (4) parameter to adjust the coding rate of the UCI. As a matter of course, the resource amount undergoing rate matching may be determined, in consideration of a combination of a part of (1) to (4) or all conditions. In addition, the information of (4) may be information notified the UE by higher layer signaling.

In the case of applying the rate matching processing to the UL data, as compared with the case of performing the puncturing processing, it is possible to perform coding so that the coding rate of the UL data is high. Particularly, in the case where the size of the UCI to multiplex into the PUSCH is large, it is possible to perform UL transmission with higher quality than in the puncturing processing.

(Aspect 2)

Aspect 2 describes the case of determining a processing method (puncturing processing or rate matching processing) applied to UL data based on a predetermined condition, when uplink control information (UCI) and the UL data (UL-SCH) is multiplexed into an uplink shared channel (PUSCH). The predetermined condition may be a parameter with consideration given to at least a payload size of the UCI. In other words, in Aspect 2, the UE selects the processing method to apply to the UL data, based on at least the payload size of the UCI.

As the predetermined condition, described below are the case of using the payload size of the UCI, and the case of using a ratio (or, ratio of the UCI to the PUSCH) between the payload size of the UCI and the payload size of the UL data. As a matter of course, the predetermined condition is not limited thereto, and it is possible to apply any parameter with consideration given to at least the payload size of the UCI.

For example, in the case where the payload size of the UCI is the predetermined condition, the processing method to apply is determined corresponding to whether or not the payload size of the UCI exceeds a predetermined value (see FIG. 2). The predetermined value may be defined or configured for each UCI type (e.g., for each A/N, CSI or SR), or may be defined or configured for total UCI to transmit using the PUSCH. Further, the predetermined value may be defined fixedly in specifications, or may be configured for the UE using higher layer signaling and the like.

Further, the predetermined condition may be tied to configuration information (e.g., numerology, center frequency, bandwidth) of a bandwidth part where the UE performs transmission of the PUSCH. For example, in the case where a plurality of bandwidth parts is configured for the UE for PUSCH transmission, one predetermined condition may be selected, corresponding to PUSCH transmission performed based on any of the bandwidth parts.

In the case where the payload size of the UCI is the predetermined value or less, the UE applies puncturing to UL data of a part of the PUSCH, and multiplexes the UCI into the PUSCH (see FIG. 2A). On the other hand, in the case where the payload size of the UCI exceeds the predetermined value, the UE applies rate matching to UL data of a part of the PUSCH, and multiplexes the UCI into the PUSCH (see FIG. 2B).

Thus, by applying rate matching in the case where the payload size of the UCI is large (exceeds the predetermined value), as compared with the case of applying puncturing, it is possible to perform UL transmission with the coding rate of the UL data increased. By this means, as compared with the case of applying the puncturing processing to all UCI on PUSCH, it is possible to improve the communication quality.

In the case where the predetermined condition is the ratio (e.g., UCI payload/UL-SCH payload) between the payload size of the UCI and the payload size of the UL data, the processing method to apply may be determined corresponding to whether or not the ratio exceeds a predetermined value (see FIG. 3). In this case, in consideration of the transmission period and/or allocation region of the PUSCH (or, UL data) to be scheduled, and the size of the UCI to multiplex into the PUSCH, the UE selects the processing method to apply to the UL data.

In the case where the ratio between the payload size of the UCI and the payload size of the UL data is a predetermined value or less, the UE applies puncturing to UL data of a part of the PUSCH, and multiplexes the UCI into the PUSCH (see FIG. 3A). On the other hand, in the case where the ratio between the payload size of the UCI and the payload size of the UL data exceeds the predetermined value, the UE applies rate matching to UL data of a part of the PUSCH, and multiplexes the UCI into the PUSCH (see FIG. 3B).

Thus, by considering the payload size of the UL data in addition to the payload size of the UCI, it is possible to determine the processing method to apply to the UL data with consideration given also to the resource amount of the PUSCH to schedule. By this means, also in the case where the transmission period and/or allocation region of the PUSCH varies dynamically, it is possible to select a more suitable processing method to control UL transmission.

(Aspect 3)

Aspect 3 describes the case of applying different conditions (parameters) to UCI and UL data (or, at the time of UL data transmission and the time of transmission of UL data+UCI), when the rate matching processing is applied to the UL data of the PUSCH in UCI on PUSCH.

In the case of applying rate matching to the UL data to multiplex UCI (e.g., A/N) into the PUSCH, when the UE makes a mistake in detection of a DL signal (which is a generation source of A/N) in response to A/N, it becomes the problem how the base station recognizes the mistake in detection in the UE. Herein, the DL signal (which is a generation source of A/N) in response to A/N refers to DL data and/or DCI for scheduling the DL data.

Ordinarily, in the case where application of the rate matching processing is configured in UCI on PUSCH, the base station performs reception processing of the PUSCH transmitted from the UE, while assuming that the UE performs rate matching on UL data of the PUSCH to multiplex the UCI. On the other hand, in the case where the UE makes a mistake in detection of a DL signal (e.g., DCI for scheduling DL data), the UE does not perform transmission (UCI on PUSCH) of the UCI (A/N). Therefore, the UE transmits the PUSCH, without performing the rate matching processing (UCI on PUSCH) for A/N on the UL data.

In order to properly receive the PUSCH in the base station when the UE makes a mistake in detection of the DL signal, the base station needs to perform the reception processing, while also assuming the mistake in detection in the UE. For example, it is considered that the base station side performs the reception processing, while considering two cases of the presence of rate matching in consideration of multiplexing of the UCI (the UE correctly receives the DL signal), and of the absence of rate matching (the UE makes the mistake in detection of the DL signal.)

Therefore, in Aspect 3, different conditions (parameters) are applied to UCI and UL data in the case of applying rate matching processing for the UCI to the UL data. For example, a condition (e.g., at least of transmit power control, phase shift control, scrambling control and sequence control) different from that of the UL data is applied to a symbol into which the UCI is multiplexed.

In addition, the case of applying the rate matching processing for the UCI to the UL data includes the indication from the base station in Aspect 1, the case where the UCI payload size exceeds the predetermined value in Aspect 2, and the like, but is not limited thereto.

The Aspect will be described below in the case of applying different conditions to the UCI and UL data (or, at the time of UL data transmission and the time of UL data+UCI transmission). With respect to a plurality of conditions (transmit power control, phase shift control, scrambling control and sequence control) described below, only one of the conditions may be applied, or any combination thereof may be applied. Further, the UE may select the condition to apply, based on an indication from the base station.

<Transmit Power Control>

The UE applies different types of power to UL data and UCI (or, symbol including the UCI) multiplexed into the PUSCH. For example, the UE selectively applies power-boosting to a symbol into which the UCI is multiplexed (see FIG. 4A). In FIG. 4A, among symbols contained in the PUSCH, the case is shown where power-boosting is applied to the symbol into which the UCI is multiplexed to set a higher level of transmit power than in the other symbols (for example, symbols into which the UL data is multiplexed, etc.).

On the PUSCH transmitted from the UE, the base station is capable of determining whether or not the UCI (e.g., A/N) is multiplexed, or the rate matching processing is performed on the UL data, corresponding to the presence or absence of the symbol applied with power-boosting.

For example, in the case where the symbol applied with power-boosting is included in the PUSCH, the base station determines that the UE applies rate matching to the UL data to transmit the UCI (the UE detects at least the DCI) to perform reception processing. On the other hand, in the case where the symbol applied with power-boosting is not included in the PUSCH, the base station determines that the UE does not multiplex the UCI into the PUSCH (e.g., the UE makes a mistake in detection of DCI, or does not perform the rate matching processing for the UCI on the UL data) to perform reception processing.

<Phase Shift Control>

The UE applies different types of phase-shifting to UL data and UCI (symbol including the UCI) multiplexed into the PUSCH. For example, on the PUSCH, the UE applies phase-shifting different from the other symbols to a symbol to which the UCI is mapped (see FIG. 4B). FIG. 4B illustrates the case of configuration, in a predetermined modulation scheme (e.g., QPSK), where the constellation for the UL data is different from the constellation for the UCI (configuration where the constellation for the UL data and the constellation for the UCI are shifted by 45 degrees).

On the PUSCH transmitted from the UE, the base station is capable of determining whether or not the UCI (e.g., A/N) is multiplexed, or the rate matching processing is performed on the UL data, corresponding to the presence or absence of the symbol applied with the QPSK constellation for the UCI.

For example, in the case where the symbol applied with the QPSK constellation for the UCI is included in the PUSCH, the base station determines that the UE applies rate matching to the UL data to transmit the UCI (the UE detects at least the DCI) to perform reception processing. On the other hand, in the case where the symbol applied with the QPSK constellation for the UCI is not included in the PUSCH, the base station determines that the UE does not multiplex the UCI into the PUSCH (e.g., the UE makes a DCI detection mistake, or does not perform the rate matching processing for the UCI on the UL data) to perform reception processing.

<Scrambling>

The UE applies different types of scrambling to UL data and UCI (symbol including the UCI) multiplexed into the PUSCH. On the PUSCH transmitted from the UE, the base station is capable of determining whether or not the UCI (e.g., A/N) is multiplexed, or the rate matching processing is performed on the UL data, corresponding to the presence or absence of the symbol applied with scrambling for the UCI.

For example, in the case where the symbol applied with scrambling for the UCI is included in the PUSCH, the base station determines that the UE applies rate matching to the UL data to transmit the UCI (the UE detects at least the DCI) to perform reception processing. On the other hand, in the case where the symbol applied with scrambling for the UCI is not included in the PUSCH, the base station determines that the UE does not multiplex the UCI into the PUSCH (e.g., the UE makes a mistake in detection of DCI, or does not perform the rate matching processing for the UCI on the UL data) to perform reception processing.

<Sequence>

The UE applies different sequences to demodulation reference signals on UL in the case of not multiplexing the UCI into the PUSCH (multiplexing only the UL data) and the case of multiplexing the UCI (multiplexing UCI+UL data). For example, the UE transmits the DMRS applied with a predetermined sequence in the case of multiplexing the UCI into the PUSCH. In addition, the sequence to apply to the demodulation reference signal (DMRS) on UL may be a cyclic shift and/or orthogonal code sequence.

On the PUSCH transmitted from the UE, the base station is capable of determining whether or not the UCI (e.g., A/N) is multiplexed, or the rate matching processing is performed on the UL data, corresponding to the presence or absence of the DMRS applied with the predetermined sequence.

For example, in the case where the DMRS applied with the predetermined sequence is included in the PUSCH, the base station determines that the UE applies rate matching to the UL data to transmit the UCI (the UE detects at least the DCI) to perform reception processing. On the other hand, in the case where the DMRS applied with the predetermined sequence is not included in the PUSCH, the base station determines that the UE does not multiplex the UCI into the PUSCH (e.g., the UE makes a mistake in detection of DCI, or does not perform the rate matching processing for the UCI on the UL data) to perform reception processing.

Thus, by applying different conditions to the UCI and UL data (or, at the time of UL data transmission and the time of UL data+UCI transmission), the base station is capable of determining whether or not the UE multiplexes the UCI into the PUSCH. By this means, the base station is capable of determining whether or not the rate matching processing for the UCI is applied to the UL data of the PUSCH to perform reception processing.

<Physical Layer Signaling Notification>

Further, the base station and/or the UE may determine whether or not the UE applies rate matching, based on physical layer signaling (L1 signaling). For example, the base station notifies the UE of UL DAI (Downlink Assignment Indicator (Index)), and based on the DAI, the UE judges the mistake in detection of DCI, and controls the rate matching processing on the UL data.

The UL DAI is an index indicative of DL assignment or the number of scheduling units in which DL data is scheduled based on the DL assignment, in scheduling units (e.g., slot, mini slot comprised of one or a plurality of symbols, component carrier, Bandwidth part (BWP), etc.) comprised of the predetermined number (predetermined groups). In other words, by using the UL DAI, it is possible to notify the UE of the number of scheduling units in which the DL data is scheduled. Based on the UL DAI, irrespective of the presence or absence of the mistake in detection of DCI (existence of DL data to which A/N should be transmitted as feedback), the UE is capable of grasping the quantity of rate matching resources of UL data.

In addition, irrespective of the value of UL DAI, the UE may determine the number of UCI (A/N) bits. In this case, the UL DAI indicates a quantity of resources (to apply rate matching to UL data) allocated to the UCI, and the actual number of UCI (A/N) bits is determined based on the number of DL assignments or the number of items of DL data (e.g., TBs) scheduled based on the DL assignment.

Alternatively, the number of UCI (A/N) bits may be determined based on a value of the UL DAI. In this case, by comparing the value of the UL DAI with the number of detections (the number of items of DL data to which A/N should be transmitted as feedback) of DCI recognized in the UE, the UE is capable of grasping the presence or absence of the mistake in detection of DCI.

For example, in the case where the UE grasps the mistake (existence of DL data to which A/N should be transmitted as feedback) in detection of DCI corresponding to the UL DAI, the UE transmits NACK as feedback at timing of A/N to be transmitted. Therefore, in the case where the timing of A/N to be transmitted overlaps with a PUSCH configuration subframe (or, (mini) slot), the UE applies rate matching to the UL data, and multiplexes the UCI (herein, NACK) into the PUSCH to control transmission.

Thus, by using the UL DAI, irrespective of the mistake in detection of DCI, the UE is capable of properly selecting the rate matching processing to perform UL transmission.

(Radio Communication System)

A configuration of a radio communication system according to this Embodiment will be described below. In the radio communication system, the radio communication method according to each of the above-mentioned Aspects is applied. In addition, the radio communication method according to each of the above-mentioned Aspects may be applied alone, or may be applied in combination.

Figure 5:
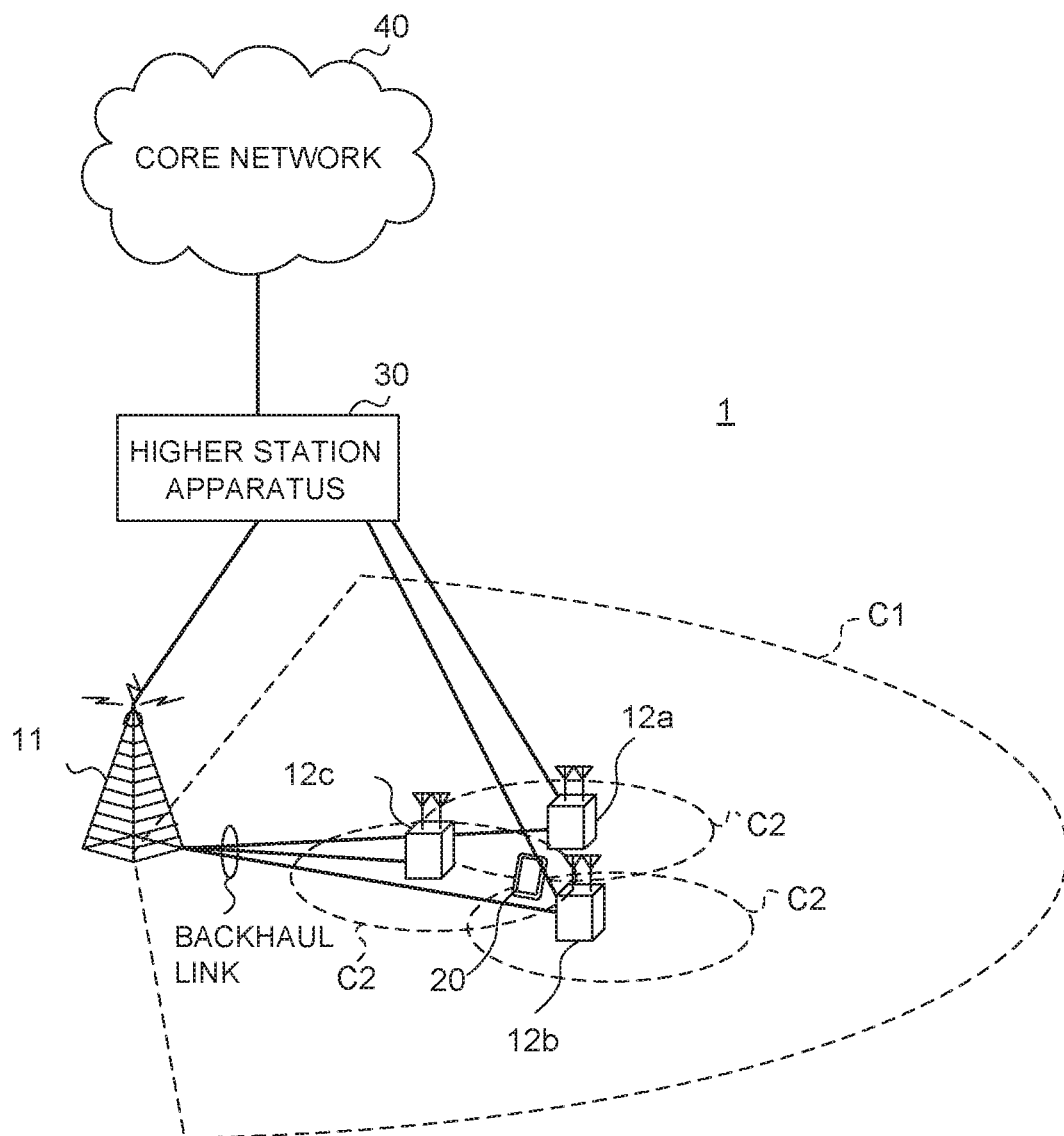
FIG. 5 is a diagram showing one example of a schematic configuration of a radio communication system according to this Embodiment.

FIG. 5 is a diagram showing one example of a schematic configuration of the radio communication system according to this Embodiment. In the radio communication system 1, it is possible to apply carrier aggregation (CA) to aggregate a plurality of base frequency blocks (component carriers) with a system bandwidth (e.g., 20 MHz) of the LTE system as one unit and/or dual connectivity (DC). In addition, the radio communication system 1 may be called SUPER 3G, LTE-A (LTE-Advanced), IMT-Advanced, 4G, 5G, FRA (Future Radio Access), NR (New RAT) and the like.

The radio communication system 1 as shown in FIG. 5 is provided with a radio base station 11 for forming a macrocell C1, and radio base stations 12a to 12c disposed inside the macrocell C1 to form small cells C2 narrower than the macrocell C1. Further, a user terminal 20 is disposed in the macrocell C1 and each of the small cells C2. It may be configured to apply different numerology between cells. In addition, the numerology refers to a set of communication parameters characterizing design of signals in some RAT and/or design of RAT.

The user terminal 20 is capable of connecting to both the radio base station 11 and the radio base station 12. The user terminal 20 is assumed to concurrently use the macrocell C1 and small cell C2 using different frequencies, by CA or DC. Further, the user terminal 20 is capable of applying CA or DC using a plurality of cells (CCs) (e.g., 2 or more CCs). Furthermore, the user terminal is capable of using a licensed band CC and an unlicensed band CC as a plurality of CCs.

Moreover, the user terminal 20 is capable of performing communication in each cell, using Time Division Duplex (TDD) or Frequency Division Duplex (FDD). A cell of TDD and a cell of FDD may be called TDD carrier (Frame configuration type 2), FDD carrier (Frame configuration type 1), or the like, respectively.

Further, in each cell (carrier), any one of a subframe (also referred to as TTI, ordinary TTI, long TTI, ordinary subframe, long subframe, slot and the like) having a relatively long time length (e.g., 1 ms) and a subframe (also referred to as short TTI, short subframe, slot and the like) having a relatively short time length may be applied, or both the long subframe and the short subframe may be applied. Further, in each cell, subframes with two or more time lengths may be applied.

The user terminal 20 and radio base station 11 are capable of communicating with each other using carriers (called the existing carrier, Legacy carrier and the like) with a narrow bandwidth in a relatively low frequency band (e.g., 2 GHz). On the other hand, the user terminal 20 and radio base station 12 may use carriers with a wide bandwidth in a relatively high frequency band (e.g., 3.5 GHz, 5 GHz, 30 GHz to 70 GHz, etc.), or may use the same carrier as in the radio base station 11. In addition, the configuration of the frequency band used in each radio base station is not limited thereto.

It is possible to configure so that the radio base station 11 and radio base station 12 (or, two radio base stations 12) undergo wired connection (e.g., optical fiber in conformity with CPRI (Common Public Radio Interface), X2 interface, etc.), or wireless connection.

The radio base station 11 and each of the radio base stations 12 are respectively connected to a higher station apparatus 30, and are connected to a core network 40 via the higher station apparatus 30. In addition, for example, the higher station apparatus 30 includes an access gateway apparatus, Radio Network Controller (RNC), Mobility Management Entity (MME) and the like, but is not limited thereto. Further, each of the radio base stations 12 may be connected to the higher station apparatus 30 via the radio base station 11.

In addition, the radio base station 11 is a radio base station having relatively wide coverage, and may be called a macro base station, collection node, eNB (eNodeB), transmission and reception point and the like. Further, the radio base station 12 is a radio base station having local coverage, and may be called a small base station, micro-base station, pico-base station, femto-base station, HeNB (Home eNodeB), RRH (Remote Radio Head), transmission and reception point and the like. Hereinafter, in the case of not distinguishing between the radio base stations 11 and 12, the stations are collectively called a radio base station 10.

Each user terminal 20 is a terminal supporting various communication schemes such as LTE and LTE-A, and may include a fixed communication terminal, as well as the mobile communication terminal. Further, the user terminal 20 is capable of performing Device-to-Device communication (D2D) with another user terminal 20

In the radio communication system 1, as radio access schemes, OFDMA (Orthogonal Frequency Division Multiple Access) is applicable on downlink (DL), and SC-FDMA (Single Carrier-Frequency Division Multiple Access) is applicable on uplink (UL). OFDMA is a multi-carrier transmission scheme for dividing a frequency band into a plurality of narrow frequency bands (subcarriers), and mapping data to each subcarrier to perform communication. SC-FDMA is a single-carrier transmission scheme for dividing a system bandwidth into bands comprised of one or contiguous resource blocks for each terminal so that a plurality of terminals uses mutually different bands, and thereby reducing interference among terminals. In addition, uplink and downlink radio access schemes are not limited to the combination of the schemes, and OFDMA may be used on UL. Further, it is possible to apply SC-FDMA to a side link (SL) used in D2D.

As DL channels, in the radio communication system 1 are used a DL data channel (PDSCH: Physical Downlink Shared Channel, also referred to as DL shared channel, etc.) shared by user terminals 20, broadcast channel (PBCH: Physical Broadcast Channel), L1/L2 control channels and the like. At least one of user data, higher layer control information and SIB (System Information Block) and the like are transmitted on the PDSCH. Further, MIB (Master Information Block) is transmitted on the PBCH.

The L1/L2 control channel includes DL control channels (e.g., PDCCH (Physical Downlink Control Channel) and/or EPDCCH (Enhanced Physical Downlink Control channel)), PCFICH (Physical Control Format Indicator Channel), PHICH (Physical Hybrid-ARQ Indicator Channel) and the like. The downlink control information (DCI) including scheduling information of the PDSCH and PUSCH and the like is transmitted on the PDCCH and/or EPDCCH. The number of OFDM symbols used in the PDCCH is transmitted on the PCFICH. The EPDCCH is frequency division multiplexed with the PDSCH to be used in transmitting the DCI and the like as the PDCCH. It is possible to transmit receipt confirmation information (A/N, HARQ-ACK) on the PUSCH, using at least one of the PHICH, PDCCH and EPDCCH.

As UL channels, in the radio communication system are used a UL data channel (PUSCH: Physical Uplink Shared Channel, also referred to as UL shared channel, etc.) shared by user terminals 20, UL control channel (PUCCH: Physical Uplink Control Channel), random access channel (PRACH: Physical Random Access Channel) and the like. User data and higher layer control information is transmitted on the PUSCH. The uplink control information (UCI) including at least one of receipt confirmation information (A/N, HARQ-ACK) on the PDSCH and channel state information (CSI) is transmitted on the PUSCH or PUCCH. It is possible to transmit a random access preamble to establish connection with the cell on the PRACH.

<Radio Base Station>

Figure 6:
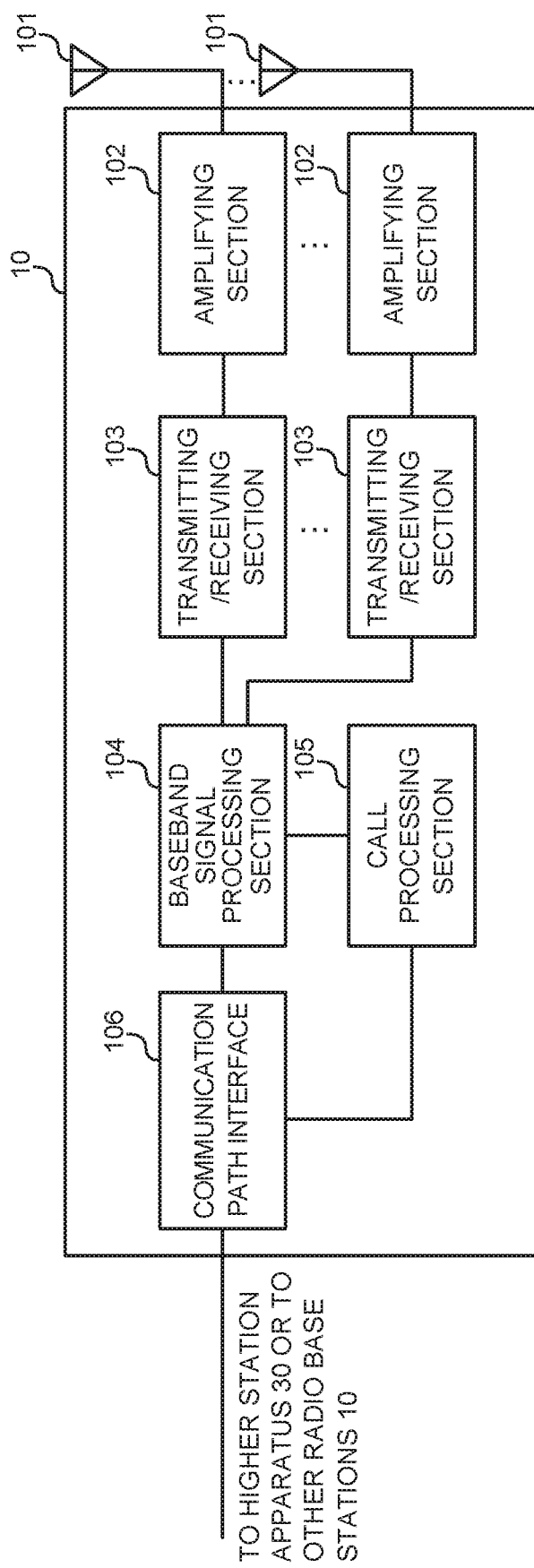
FIG. 6 is a diagram showing one example of an entire configuration of a radio base station according to this Embodiment.

FIG. 6 is a diagram showing one example of an entire configuration of the radio base station according to this Embodiment. The radio base station is provided with a plurality of transmitting/receiving antennas 101, amplifying sections 102, transmitting/receiving sections 103, baseband signal processing section 104, call processing section 105, and communication path interface 106. In addition, with respect to each of the transmitting/receiving antenna 101, amplifying section 102, and transmitting/receiving section 103, the radio base station may be configured to include at least one or more.

User data to transmit to the user terminal 20 from the radio base station 10 on downlink is input to the baseband signal processing section 104 from the higher station apparatus 30 via the communication path interface 106.

The baseband signal processing section 104 performs, on the user data, transmission processing including at least one of processing of PDCP (Packet Data Convergence Protocol) layer, segmentation and concatenation of the user data, transmission processing of RLC (Radio Link Control) layer such as RLC retransmission control, MAC (Medium Access Control) retransmission control (e.g., processing of HARQ (Hybrid Automatic Request reQuest)), scheduling, transmission format selection, channel coding, rate matching, scrambling, Inverse Fast Fourier Transform (IFFT) processing and precoding processing, and the like to transfer to the transmitting/receiving sections 103. Further, also concerning a downlink control signal, the section 104 performs transmission processing such as channel coding and/or Inverse Fast Fourier Transform on the signal to transfer to the transmitting/receiving sections 103.

Each of the transmitting/receiving sections 103 converts the baseband signal, which is subjected to precoding for each antenna and is output from the baseband signal processing section 104, into a signal with a radio frequency band to transmit. The radio-frequency signal subjected to frequency conversion in the transmitting/receiving section 103 is amplified in the amplifying section 102, and is transmitted from the transmitting/receiving antenna 101.

The transmitting/receiving section 103 is capable of being comprised of a transmitter/receiver, transmitting/receiving circuit or transmitting/receiving apparatus explained based on common recognition in the technical field according to the present invention. In addition, the transmitting/receiving section 103 may be comprised as an integrated transmitting/receiving section, or may be comprised of a transmitting section and receiving section.

On the other hand, for UL signals, radio-frequency signals received in the transmitting/receiving antennas 101 are amplified in the amplifying sections 102. The transmitting/receiving section 103 receives the UL signal amplified in the amplifying section 102. The transmitting/receiving section 103 performs frequency conversion on the received signal into a baseband signal to output to the baseband signal processing section 104.

For UL data included in the input UL signal, the baseband signal processing section 104 performs Fast Fourier Transform (FFT) processing, Inverse Discrete Fourier Transform (IDFT) processing, error correcting decoding, reception processing of MAC retransmission control, and reception processing of RLC layer and PDCP layer to transfer to the higher station apparatus 30 via the communication path interface 106. The call processing section 105 performs at least one of call processing such as configuration and release of a communication channel, state management of the radio base station 10, and management of radio resources.

The communication path interface 106 transmits and receives signals to/from the higher station apparatus via a predetermined interface. Further, the communication path interface 106 may transmit and receive signals (backhaul signaling) to/from another adjacent radio base station 10 via an inter-base station interface (e.g., optical fiber in conformity with CPRI (Common Public Radio Interface), X2 interface).

The transmitting/receiving section 103 receives the uplink control information multiplexed into the uplink shared channel. In the case of multiplexing the uplink data and uplink control information into the uplink shared channel to transmit, the transmitting/receiving section 103 transmits information for indicating the puncturing processing or the rate matching processing to apply to the uplink data.

Figure 7:
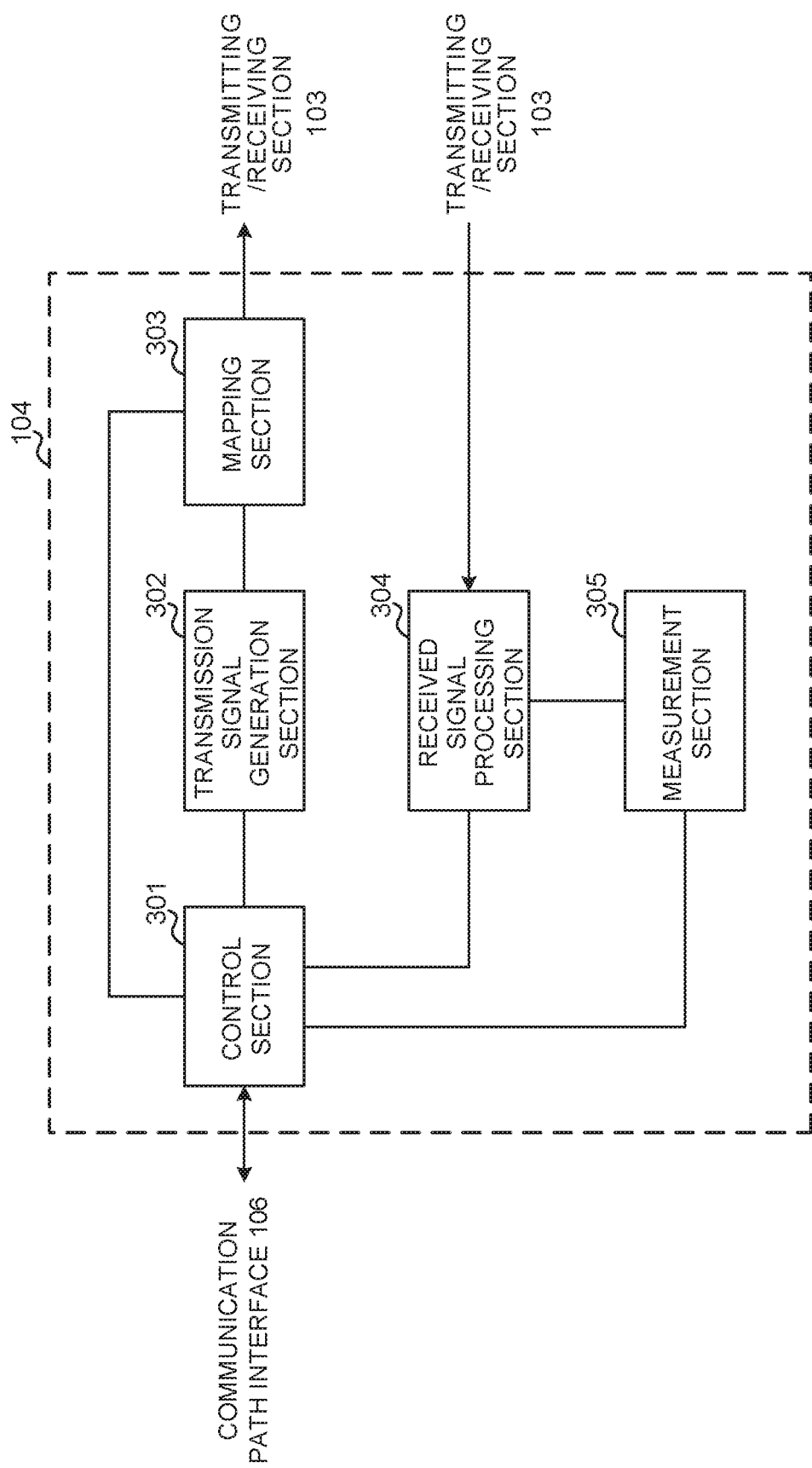
FIG. 7 is a diagram showing one example of a function configuration of the radio base station according to this Embodiment.

FIG. 7 is a diagram showing one example of a function configuration of the radio base station according to this Embodiment. In addition, FIG. 7 mainly illustrates function blocks of a characteristic portion in this Embodiment, and the radio base station is assumed to have other function blocks required for radio communication. As shown in FIG. 7, the baseband signal processing section 104 is provided with a control section 301, transmission signal generating section 302, mapping section 303, received signal processing section 304, and measurement section 305.

The control section 301 performs control of the entire radio base station 10. For example, the control section 301 controls at least one of generation of DL signals by the transmission signal generating section 302, mapping of DL signals by the mapping section 303, reception processing (e.g., demodulation, etc.) of UL signals by the received signal processing section 304, and measurement by the measurement section 305.

Specifically, the control section 301 performs scheduling of the user terminal 20. For example, the control section 301 controls transmission timing and/or transmission period of the uplink shared channel, and transmission timing and/or transmission period of the uplink control information.

Further, in the case of multiplexing the uplink data and uplink control information into the uplink shared channel to transmit, the control section 301 may control application of the puncturing processing or the rate matching processing to the uplink data to notify the user terminal.

The control section 301 is capable of being comprised of a controller, control circuit or control apparatus explained based on the common recognition in the technical field according to the present invention.

Based on indications from the control section 301, the transmission signal generating section 302 generates DL signals (including the DL data signal, DL control signal and DL reference signal) to output to the mapping section 303.

The transmission signal generating section 302 is capable of being a signal generator, signal generating circuit or signal generating apparatus explained based on the common recognition in the technical field according to the present invention.

Based on indications from the control section 301, the mapping section 303 maps the DL signal generated in the transmission signal generating section 302 to predetermined radio resources to output to the transmitting/receiving section 103. The mapping section 303 is capable of being a mapper, mapping circuit or mapping apparatus explained based on the common recognition in the technical field according to the present invention.

The received signal processing section 304 performs reception processing (e.g., demapping, demodulation, decoding, etc.) on the UL signal (e.g., including the UL data signal, UL control signal and UL reference signal) transmitted from the user terminal 20. Specifically, the received signal processing section 304 may output the received signal and/or signal subjected to the reception processing to the measurement section 305. Further, based on the UL control channel configuration indicated from the control section 301, the received signal processing section 304 performs the reception processing of the UCI.

The measurement section 305 performs measurement on the received signal. The measurement section 305 is capable of being comprised of a measurement device, measurement circuit or measurement apparatus explained based on the common recognition in the technical field according to the present invention.

For example, based on received power (e.g., RSRP (Reference Signal Received Power)) and/or received quality (e.g., RSRQ (Reference Signal Received Quality)) of the UL reference signal, the measurement section 305 may measure the channel quality of UL. The measurement result may be output to the control section 301.

<User Terminal>

Figure 8:
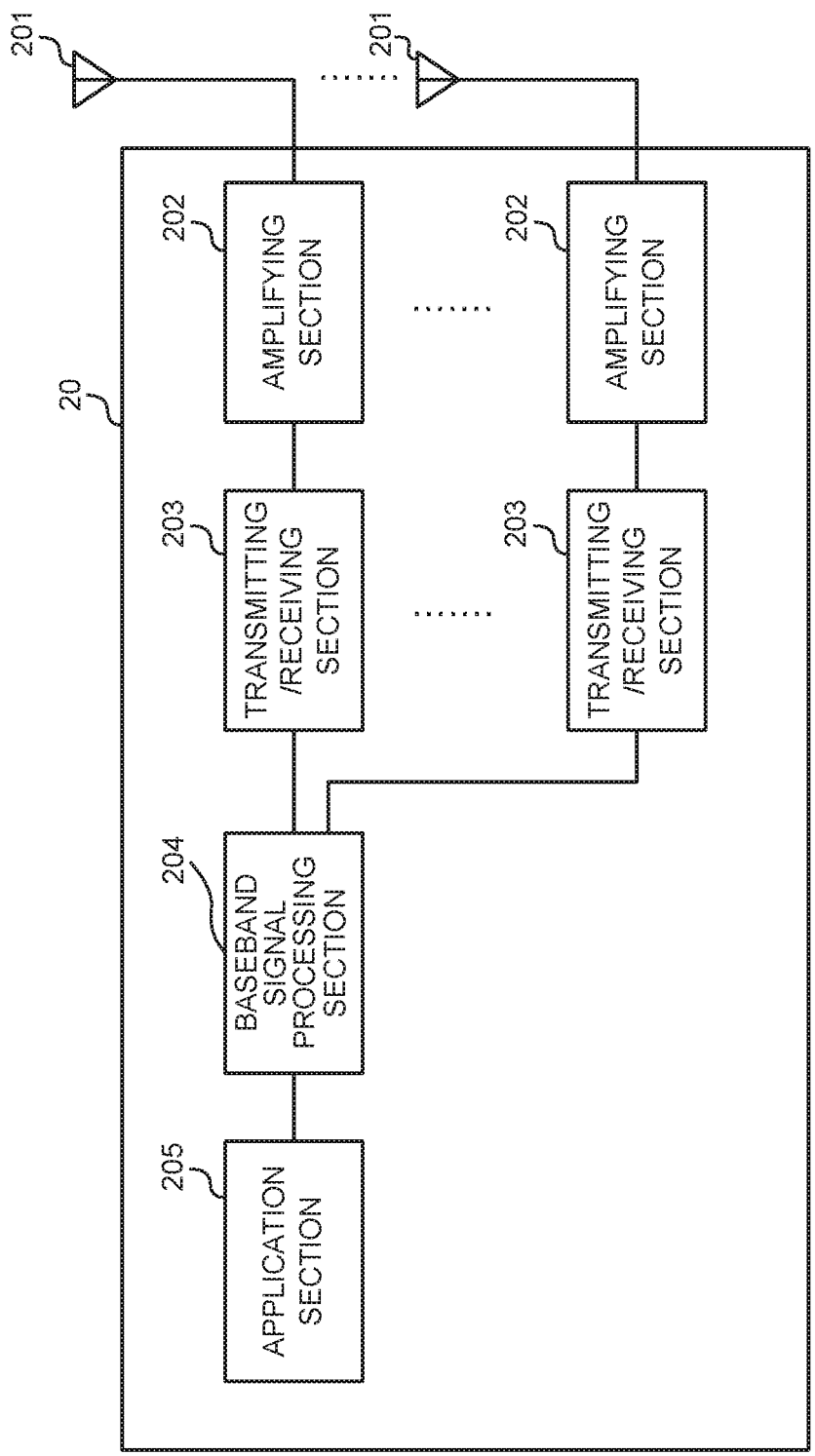
FIG. 8 is a diagram showing one example of an entire configuration of a user terminal according to this Embodiment.

FIG. 8 is a diagram showing one example of an entire configuration of the user terminal according to this Embodiment. The user terminal 20 is provided with a plurality of transmitting/receiving antennas 201 for MIMO transmission, amplifying sections 202, transmitting/receiving sections 203, baseband signal processing section 204, and application section 205.

Radio-frequency signals received in a plurality of transmitting/receiving antennas 201 are respectively amplified in the amplifying sections 202. Each of the transmitting/receiving sections 203 receives the DL signal amplified in the amplifying section 202. The transmitting/receiving section 203 performs frequency conversion on the received signal into a baseband signal to output to the baseband signal processing section 204.

The baseband signal processing section 204 performs at least one of FFT processing, error correcting decoding, reception processing of retransmission control and the like on the input baseband signal. DL data is transferred to the application section 205. The application section 205 performs processing concerning layers higher than the physical layer and MAC layer, and the like.

On the other hand, for UL data, the data is input to the baseband signal processing section 204 from the application section 205. The baseband signal processing section 204 performs, on the data, at least one of retransmission control processing (e.g., processing of HARQ), channel coding, rate matching, puncturing, Discrete Fourier Transform (DFT) processing, IFFT processing and the like to transfer to each of the transmitting/receiving sections 203. Also on the UCI (e.g., at least one of A/N of the DL signal, channel state information (CSI) and scheduling request (SR) and the like), the section 204 performs at least one of channel coding, rete matching, puncturing, DFT processing, IFFT processing and the like to transfer to each of the transmitting/receiving sections 203.

Each of the transmitting/receiving sections 203 converts the baseband signal output from the baseband signal processing section 204 into a signal with a radio frequency band to transmit. The radio-frequency signals subjected to frequency conversion in the transmitting/receiving sections 203 are amplified in the amplifying sections 202, and are transmitted from the transmitting/receiving antennas 201, respectively.

Further, in the case where the transmission period of the uplink shared channel overlaps with at least a part of the transmission period of the uplink control information, the transmitting/receiving section 203 transmits the uplink control information, using the uplink shared channel. Furthermore, in the case of multiplexing the uplink data and uplink control information into the uplink shared channel to transmit, the transmitting/receiving section 203 may receive the information for indicating the puncturing processing or the rate matching processing to apply to the uplink data.

The transmitting/receiving section 203 is capable of being a transmitter/receiver, transmitting/receiving circuit or transmitting/receiving apparatus explained based on the common recognition in the technical field according to the present invention. In addition, the transmitting/receiving section 203 may be comprised as an integrated transmitting/receiving section, or may be comprised of a transmitting section and receiving section.

Figure 9:
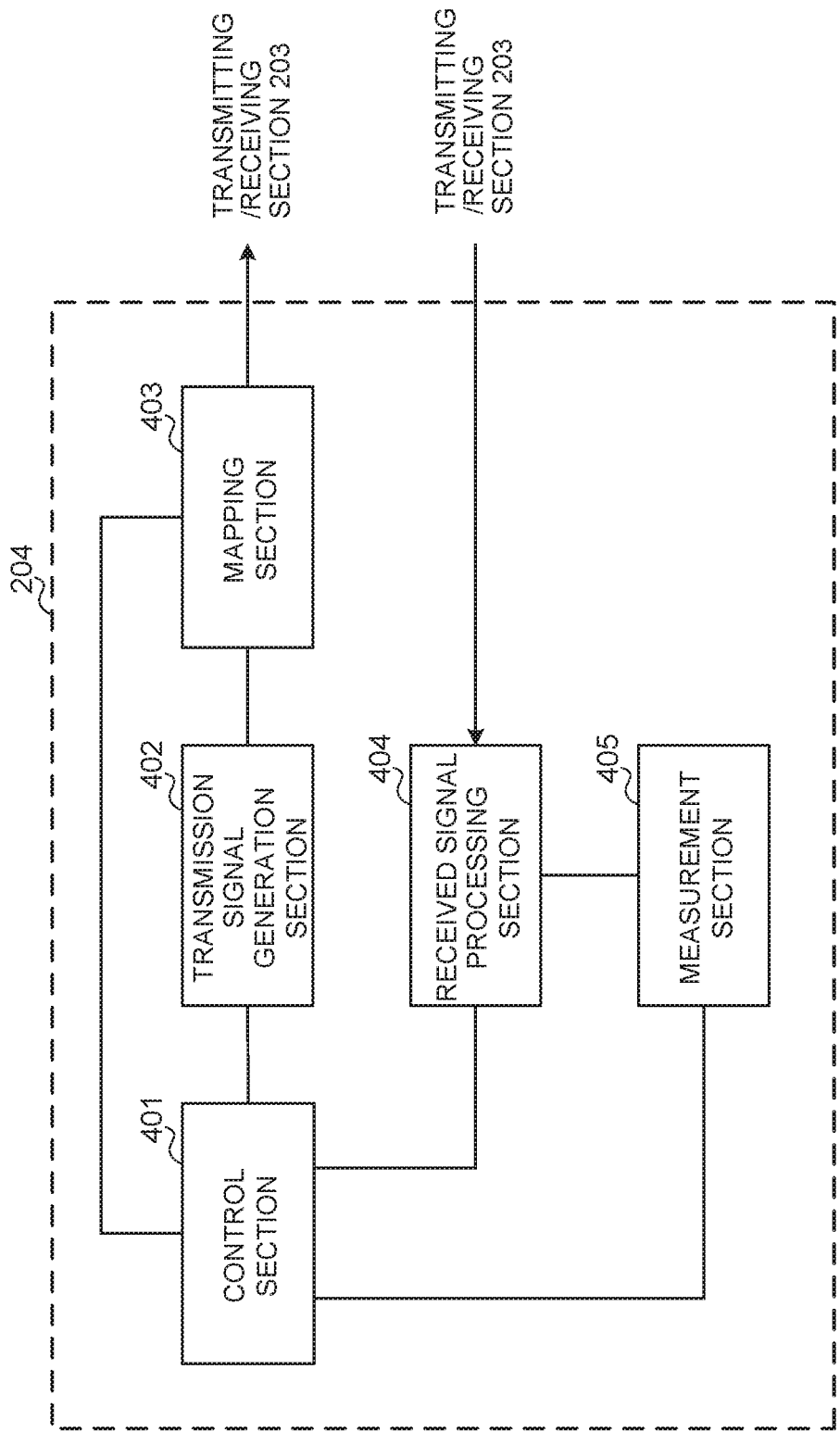
FIG. 9 is a diagram showing one example of a function configuration of the user terminal according to this Embodiment.

FIG. 9 is a diagram showing one example of a function configuration of the user terminal according to this Embodiment. In addition, FIG. 9 mainly illustrates function blocks of a characteristic portion in this Embodiment, and the user terminal 20 is assumed to have other function blocks required for radio communication. As shown in FIG. 9, the baseband signal processing section 204 that the user terminal 20 has is provided with a control section 401, transmission signal generating section 402, mapping section 403, received signal processing section 404, and measurement section 405.

The control section 401 performs control of the entire user terminal 20. For example, the control section 401 controls at least one of generation of UL signals by the transmission signal generating section 402, mapping of UL signals by the mapping section 403, reception processing of DL signals by the received signal processing section 404, and measurement by the measurement section 405.

Further, the control section 401 controls transmission of the uplink control information using the uplink shared channel. For example, in the case of multiplexing the uplink data and uplink control information into the uplink shared channel to transmit, based on an indication from the base station and/or the predetermined condition, the control section 401 controls so as to select one of the puncturing processing and the rate matching processing to apply to the uplink data.

Furthermore, irrespective of payloads of the uplink data and uplink control information, based on notification from the base station, the control section 401 may select one of the puncturing processing and the rate matching processing (see FIG. 1). Alternatively, based on the payload of the uplink data and/or the uplink control information, the control section 401 may select one of the puncturing processing and the rate matching processing (see FIGS. 2 and 3).

Still furthermore, based on at least one of the number of bits of the uplink control information, a resource amount of the uplink data scheduled in the uplink shared channel, and a coding rate of the uplink data and/or the uplink control information, the control section 401 may control a resource amount of the uplink data on which the puncturing processing or the rate matching processing is performed.

Moreover, in the case of applying the rate matching processing to the uplink data and multiplexing the uplink data and uplink control information into the uplink shared channel, the control section 401 may apply a condition different from that of the uplink data to the uplink control information (see FIG. 4, etc.)

The control section 401 is capable of being comprised of a controller, control circuit or control apparatus explained based on the common recognition in the technical field according to the present invention.

Based on indications from the control section 401, the transmission signal generating section 402 generates (e.g., performs coding, rate matching, puncturing, modulation, etc. on) UL signals (including the UL data signal, UL control signal, UL reference signal and UCI) to output to the mapping section 403. The transmission signal generating section 402 is capable of being a signal generator, signal generating circuit or signal generating apparatus explained based on the common recognition in the technical field according to the present invention.

Based on indications from the control section 401, the mapping section 403 maps the UL signal generated in the transmission signal generating section 402 to radio resources to output to the transmitting/receiving section 203. The mapping section 403 is capable of being a mapper, mapping circuit or mapping apparatus explained based on the common recognition in the technical field according to the present invention.

The received signal processing section 404 performs reception processing (e.g., demapping, demodulation, decoding, etc.) on the DL signal (DL data signal, scheduling information, DL control signal, DL reference signal). The received signal processing section 404 outputs the information received from the radio base station 10 to the control section 401. For example, the received signal processing section 404 outputs, to the control section 401, the broadcast information, system information, higher layer control information by higher layer signaling such as RRC signaling, physical layer control information (L1/L2 control information), and the like.

The received signal processing section 404 is capable of being comprised of a signal processor, signal processing circuit or signal processing apparatus explained based on the common recognition in the technical field according to the present invention. Further, the received signal processing section 404 is capable of constituting the receiving section according to the present invention.

Based on the reference signal (e.g., CSI-RS) from the radio base station 10, the measurement section 405 measures a channel state, and outputs the measurement result to the control section 401. In addition, measurement of the channel state may be performed for each CC.

The measurement section 405 is capable of being comprised of a signal processing device, signal processing circuit or signal processing apparatus and a measurement device, measurement circuit or measurement apparatus explained based on the common recognition in the technical field according to the present invention.

<Hardware Configuration>

In addition, the block diagrams used in explanation of the above-mentioned Embodiment show blocks on a function-by-function basis. These function blocks (configuration sections) are actualized by any combination of hardware and/or software. Further, the means for actualizing each function block is not limited particularly. In other words, each function block may be actualized using a single apparatus combined physically and/or logically, or two or more apparatuses that are separated physically and/or logically are connected directly and/or indirectly (e.g., using cable and/or radio), and each function block may be actualized using a plurality of these apparatuses.

Figure 10:
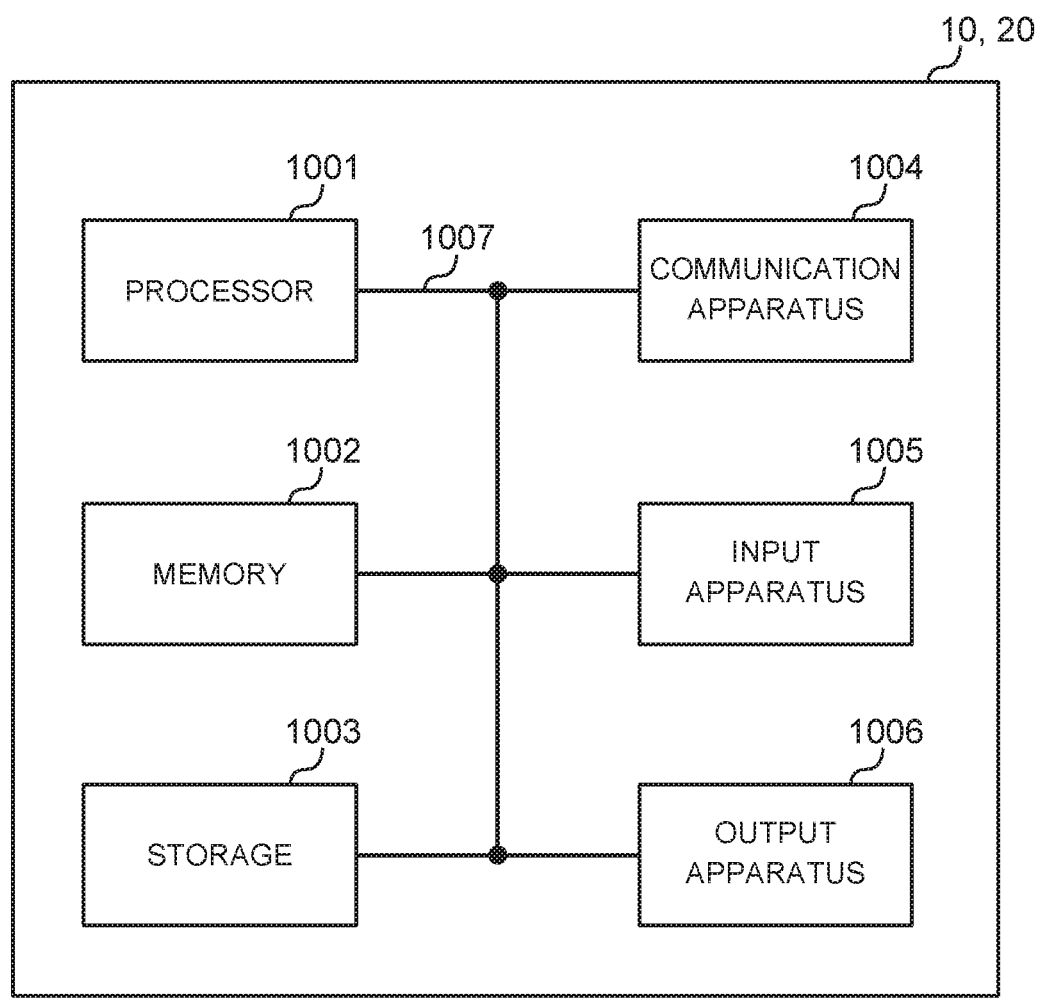
FIG. 10 is a diagram showing one example of hardware configurations of the radio base station and user terminal according to this Embodiment.

For example, each of the radio base station, user terminal and the like in this Embodiment may function as a computer that performs the processing of the radio communication method of the present invention. FIG. 10 is a diagram showing one example of a hardware configuration of each of the radio base station and user terminal according to this Embodiment. Each of the radio base station 10 and user terminal 20 as described above may be physically configured as a computer apparatus including a processor 1001, memory 1002, storage 1003, communication apparatus 1004, input apparatus 1005, output apparatus 1006, bus 1007 and the like.

In addition, in the following description, it is possible to replace the letter of "apparatus" with a circuit, device, unit and the like to read. With respect to each apparatus shown in the figure, the hardware configuration of each of the radio base station 10 and the user terminal 20 may be configured so as to include one or a plurality of apparatuses, or may be configured without including a part of apparatuses.

For example, a single processor 1001 is shown in the figure, but a plurality of processors may exist. Further, the processing may be executed by a single processor, or may be executed by one or more processors at the same time, sequentially or using another technique. In addition, the processor 1001 may be implemented on one or more chips.

For example, each function in the radio base station 10 and user terminal 20 is actualized in a manner such that predetermined software (program) is read on the hardware of the processor 1001, memory 1002 and the like, and that the processor 1001 thereby performs computations, and controls communication via the communication apparatus 1004, and read and/or write of data in the memory 1002 and storage 1003.

For example, the processor 1001 operates an operating system to control the entire computer. The processor 1001 may be comprised of a Central Processing Unit (CPU) including interfaces with peripheral apparatuses, control apparatus, computation apparatus, register and the like. For example, the above-mentioned baseband signal processing section 104 (204), call processing section 105 and the like may be actualized by the processor 1001.

Further, the processor 1001 reads the program (program code), software module, data and the like on the memory 1002 from the storage 1003 and/or the communication apparatus 1004, and according thereto, executes various kinds of processing. Used as the program is a program that causes the computer to execute at least a part of operation described in the above-mentioned Embodiment. For example, the control section 401 of the user terminal 20 may be actualized by a control program stored in the memory 1002 to operate in the processor 1001, and the other function blocks may be actualized similarly.

The memory 1002 is a computer-readable storage medium, and for example, may be comprised of at least one of ROM (Read Only Memory), EPROM (Erasable Programmable ROM), EEPROM (Electrically EPROM), RAM (Random Access Memory) and other proper storage media. The memory 1002 may be called the register, cache, main memory (main storage apparatus) and the like. The memory 1002 is capable of storing the program (program code), software module and the like executable to implement the radio communication method according to this Embodiment.

The storage 1003 is a computer-readable storage medium, and for example, may be comprised of at least one of a flexible disk, floppy (Registered Trademark) disk, magneto-optical disk (e.g., compact disk (CD-ROM (Compact Disc ROM), etc.), digital multi-purpose disk, Blu-ray (Registered Trademark) disk), removable disk, hard disk drive, smart card, flash memory device (e.g., card, stick, key drive), magnetic stripe, database, server and other proper storage media. The storage 1003 may be called an auxiliary storage apparatus.

The communication apparatus 1004 is hardware (transmitting/receiving device) to perform communication between computers via a wired and/or wireless network, and for example, is also referred to as a network device, network controller, network card, communication module and the like. For example, in order to actualize Frequency Division Duplex (FDD) and/or Time Division Duplex (TDD), the communication apparatus 1004 may be comprised by including a high-frequency switch, duplexer, filter, frequency synthesizer and the like.

For example, the transmitting/receiving antenna 101 (201), amplifying section 102 (202), transmitting/receiving section 103 (203), communication path interface 106 and the like as described above may be actualized by the communication apparatus 1004.

The input apparatus 1005 is an input device (e.g., keyboard, mouse, microphone, switch, button, sensor, etc.) that receives input from the outside. The output apparatus 1006 is an output device (e.g., display, speaker, LED (Light Emitting Diode) lamp, etc.) that performs output to the outside. In addition, the input apparatus 1005 and output apparatus 1006 may be an integrated configuration (e.g., touch panel).

Further, each apparatus of the processor 1001, memory 1002 and the like is connected on the bus 1007 to communicate information. The bus 1007 may be configured using a single bus, or may be configured using different buses between apparatuses.

Furthermore, each of the radio base station 10 and user terminal 20 may be configured by including hardware such as a microprocessor, Digital Signal Processor (DSP), ASIC (Application Specific Integrated Circuit), PLD (Programmable Logic Device), and FPGA (Field Programmable Gate Array), or a part or the whole of each function block may be actualized using the hardware. For example, the processor 1001 may be implemented using at least one of the hardware.

(Modification)

In addition, the term explained in the present Description and/or the term required to understand the present Description may be replaced with a term having the same or similar meaning. For example, the channel and/or the symbol may be a signal (signaling). Further, the signal may be a message. The reference signal is capable of being abbreviated as RS (Reference Signal), and according to the standard to apply, may be called a pilot, pilot signal and the like. Furthermore, a component carrier (CC) may be called a cell, frequency carrier, carrier frequency and the like.

Further, a radio frame may be comprised of one or a plurality of frames in the time domain. The one or each of the plurality of frames constituting the radio frame may be called a subframe. Furthermore, the subframe may be comprised of one or a plurality of slots in the time domain. The subframe may be a fixed time length (e.g., 1 ms) that is not dependent on numerology.

Furthermore, the slot may be comprised of one or a plurality of symbols (OFDM (Orthogonal Frequency Division Multiplexing) symbols, SC-FDMA (Single Carrier Frequency Division Multiple Access) symbols and the like) in the time domain. Still furthermore, the slot may a time unit based on numerology. Moreover, the slot may include a plurality of mini slots. Each mini slot may be comprised of one or a plurality of symbols in the time domain. Further, the mini slot may be called a subslot.

Each of the radio frame, subframe, slot, mini slot and symbol represents a time unit in transmitting a signal. For the radio frame, subframe, slot, mini slot and symbol, another name corresponding to each of them may be used. For example, one subframe may be called Transmission Time Interval (TTI), a plurality of contiguous subframes may be called TTI, or one slot or one mini slot may be called TTI. In other words, the subframe and/or TTI may be the subframe (1 ms) in existing LTE, may be a frame (e.g., 1 to 13 symbols) shorter than 1 ms, or may be a frame longer than 1 ms. In addition, instead of the subframe, the unit representing the TTI may be called the slot, mini slot and the like.

Herein, for example, the TTI refers to a minimum time unit of scheduling in radio communication. For example, in the LTE system, the radio base station performs scheduling for allocating radio resources (frequency bandwidth, transmit power and the like capable of being used in each user terminal) to each user terminal in a TTI unit. In addition, the definition of the TTI is not limited thereto.

The TTI may be a transmission time unit of a data packet (transport block) subjected to channel coding, code block and/or codeword, or may be a processing unit of scheduling, link adaptation and the like. In addition, when the TTI is given, a time segment (e.g., the number of symbols) to which the transport block, code block and/or codeword is actually mapped may be shorter than the TTI.

In addition, when one slot or one mini slot is called the TTI, one or more TTIs (i.e., one or more slots, or one or more mini slots) may be the minimum time unit of scheduling. Further, the number of slots (the number of mini slots) constituting the minimum time unit of scheduling may be controlled.

The TTI having a time length of 1 ms may be called ordinary TTI (TTI in LTE Rel.8-12), normal TTI, long TTI, ordinary subframe, normal subframe, long subframe or the like. The TTI shorter than the ordinary TTI may be called shortened TTI, short TTI, partial or fractional TTI, shortened subframe, short subframe, mini slot, subslot or the like.

In addition, the long TTI (e.g., ordinary TTI, subframe, etc.) may be read with TTI having a time length exceeding 1 ms, and the short TTI (e.g., shortened TTI, etc.) may be read with TTI having a TTI length of 1 ms or more and less than the TTI length of the long TTI.

The resource block (RB) is a resource allocation unit in the time domain and frequency domain, and may include one or a plurality of contiguous subcarriers in the frequency domain. Further, the RB may include one or a plurality of symbols in the time domain, and may be a length of 1 slot, 1 mini slot, 1 subcarrier, or 1 TTI. Each of 1 TTI and 1 subframe may be comprised of one or a plurality of resource blocks. In addition, one or a plurality of RBs may be called a physical resource block (PRB: Physical RB), subcarrier group (SCG: Sub-Carrier Group), resource element group (REG), PRB pair, RB pair and the like.

Further, the resource block may be comprised of one or a plurality of resource elements (RE: Resource Element). For example, 1 RE may be a radio resource region of 1 subcarrier and 1 symbol.

In addition, structures of the above-mentioned radio frame, subframe, slot, mini slot, symbol and the like are only illustrative. For example, it is possible to modify, in various manners, configurations of the number of subframes included in the radio frame, the number of slots per subframe or radio frame, the number of mini slots included in the slot, the numbers of symbols and RBs included in the slot or mini slot, the number of subcarriers included in the RB, the number of symbols within the TTI, the symbol length, the cyclic prefix (CP) length and the like.

Further, the information, parameter and the like explained in the present Description may be expressed using an absolute value, may be expressed using a relative value from a predetermined value, or may be expressed using another corresponding information. For example, the radio resource may be indicated by a predetermined index.

The names used in the parameter and the like in the present Description are not restrictive names in any respects. For example, it is possible to identify various channels (PUCCH (Physical Uplink Control Channel), PDCCH (Physical Downlink Control Channel) and the like) and information elements, by any suitable names, and therefore, various names assigned to these various channels and information elements are not restrictive names in any respects.

The information, signal and the like explained in the present Description may be represented by using any of various different techniques. For example, the data, order, command, information, signal, bit, symbol, chip and the like capable of being described over the entire above-mentioned explanation may be represented by voltage, current, electromagnetic wave, magnetic field or magnetic particle, optical field or photon, or any combination thereof.

Further, the information, signal and the like are capable of being output from a higher layer to a lower layer, and/or from the lower layer to the higher layer. The information, signal and the like may be input and output via a plurality of network nodes.

The input/output information, signal and the like may be stored in a particular place (e.g., memory), or may be managed using a management table. The input/output information, signal and the like are capable of being rewritten, updated or edited. The output information, signal and the like may be deleted. The input information, signal and the like may be transmitted to another apparatus.

Notification of the information is not limited to the Aspects/Embodiment described in the present Description, and may be performed using another method. For example, notification of the information may be performed using physical layer signaling (e.g., Downlink Control Information (DCI), Uplink Control Information (UCI)), higher layer signaling (e.g., RRC (Radio Resource Control) signaling, broadcast information (Master Information Block (MIB), System Information Block (SIB) and the like), MAC (Medium Access Control) signaling), other signals, or combination thereof.

In addition, the physical layer signaling may be called L1/L2 (Layer 1/Layer 2) control information (L1/L2 control signal), L1 control information (L1 control signal) and the like. Further, the RRC signaling may be called RRC message, and for example, may be RRC connection setup (RRC Connection Setup) message, RRC connection reconfiguration (RRC Connection Reconfiguration) message, and the like. Furthermore, for example, the MAC signaling may be notified using MAC Control Element (MAC CE).

Further, notification of predetermined information (e.g., notification of "being X") is not limited to explicit notification, and may be performed implicitly (e.g., notification of the predetermined information is not performed, or by notification of different information).

The decision may be made with a value ("0" or "1") expressed by 1 bit, may be made with a Boolean value represented by true or false, or may be made by comparison with a numerical value (e.g., comparison with a predetermined value).

Irrespective of that the software is called software, firmware, middleware, micro-code, hardware descriptive term, or another name, the software should be interpreted widely to mean a command, command set, code, code segment, program code, program, sub-program, software module, application, software application, software package, routine, sub-routine, object, executable file, execution thread, procedure, function and the like.

Further, the software, command, information and the like may be transmitted and received via a transmission medium. For example, when the software is transmitted from a website, server or another remote source using wired techniques (coaxial cable, optical fiber cable, twisted pair, Digital Subscriber Line (DSL) and the like) and/or wireless techniques (infrared, microwave and the like), these wired techniques and/or wireless techniques are included in the definition of the transmission medium.

The terms of "system" and "network" used in the present Description are used interchangeably.

In the present Description, the terms of "Base Station (BS)", "radio base station", "eNB", "gNB", "cell", "sector", "cell group", "carrier" and "component carrier" are capable of being used interchangeably. There is the case where the base station is called by the terms of fixed station, NodeB, eNodeB (eNB), access point, transmission point, reception point, femto-cell, small cell and the like.

The base station is capable of accommodating one or a plurality of (e.g., three) cells (also called the sector). When the base station accommodates a plurality of cells, the entire coverage area of the base station is capable of being segmented into a plurality of smaller areas, and each of the smaller areas is also capable of providing communication services by a base station sub-system (e.g., small base station (RRH: Remote Radio Head) for indoor use). The term of "cell" or "sector" refers to a part or the whole of coverage area of the base station and/or base station subsystem that performs communication services in the coverage.

In the present Description, the terms of "Mobile Station (MS)", "user terminal", "User Equipment (UE)", and "terminal" are capable of being used interchangeably. There is the case where the base station is called by the terms of fixed station, NodeB, eNodeB (eNB), access point, transmission point, reception point, femto-cell, small cell and the like.

There is the case where the Mobile Station may be called using a subscriber station, mobile unit, subscriber unit, wireless unit, remote unit, mobile device, wireless device, wireless communication device, remote device, mobile subscriber station, access terminal, mobile terminal, wireless terminal, remote terminal, handset, user agent, mobile client, client, or some other suitable terms, by a person skilled in the art.

Further, the radio base station in the present Description may be read with the user terminal. For example, each Aspect/Embodiment of the present invention may be applied to a configuration where communication between the radio base station and the user terminal is replaced with communication among a plurality of user terminals (D2D: Device-to-Device). In this case, the functions that the above-mentioned radio base station 10 has may be the configuration that the user terminal 20 has. Further, the words of "up", "down" and the like may be read with "side". For example, the uplink channel may be read with a side channel.

Similarly, the user terminal in the present Description may be read with the radio base station. In this case, the functions that the above-mentioned user terminal 20 has may be the configuration that the radio base station 10 has.

In the present Description, operation performed by the base station may be performed by an upper node thereof in some case. In a network including one or a plurality of network nodes having the base station, it is obvious that various operations performed for communication with the terminal are capable of being performed by the base station, one or more network nodes (e.g., MME (Mobility Management Entity), S-GW (Serving-Gateway) and the like are considered, but the invention is not limited thereto) except the base station, or combination thereof.

Each Aspect/Embodiment explained in the present Description may be used alone, may be used in combination, or may be switched and used according to execution. Further, with respect to the processing procedure, sequence, flowchart and the like of each Aspect/Embodiment explained in the present Description, unless there is a contradiction, the order may be changed. For example, with respect to the methods explained in the present Description, elements of various steps are presented in illustrative order, and are not limited to the presented particular order.

Each Aspect/Embodiment explained in the present Description may be applied to LTE (Long Term Evolution), LTE-A (LTE-Advanced), LTE-B (LTE-Beyond), SUPER 3G, IMT-Advanced, 4G (4th generation mobile communication system), 5G (5th generation mobile communication system), FRA (Future Radio Access), New-RAT (Radio Access Technology), NR (New Radio), NX (New radio access), FX (Future generation radio access), GSM (Registered Trademark) (Global System for Mobile communications), CDMA 2000, UMB (Ultra Mobile Broadband), IEEE 802.11 (Wi-Fi (Registered Trademark)), IEEE 802.16 (WiMAX (Registered Trademark)), IEEE 802.20, UWB (Ultra-WideBand), Bluetooth (Registered Trademark), system using another proper radio communication method and/or the next-generation system extended based thereon.

The description of "based on" used in the present Description does not mean "based on only", unless otherwise specified. In other words, the description of "based on" means both of "based on only" and "based on at least".

Any references to elements using designations of "first", "second" and the like used in the present Description do not limit the amount or order of these elements overall. These designations are capable of being used in the present Description as the useful method to distinguish between two or more elements. Accordingly, references of first and second elements do not mean that only two elements are adopted, or that the first element should be prior to the second element in any manner.

There is the case where the term of "determining" used in the present Description includes various types of operation. For example, "determining" may be regarded as "determining" calculating, computing, processing, deriving, investigating, looking up (e.g., looking up in a table, database or another data structure), ascertaining and the like. Further, "determining" may be regarded as "determining" receiving (e.g., receiving information), transmitting (e.g., transmitting information), input, output, accessing (e.g., accessing data in memory) and the like. Furthermore, "determining" may be regarded as "determining" resolving, selecting, choosing, establishing, comparing and the like. In other words, "determining" may be regarded as "determining" some operation.

The terms of "connected" and "coupled" used in the present Description or any modifications thereof mean direct or indirect every connection or coupling among two or more elements, and are capable of including existence of one or more intermediate elements between two mutually "connected" or "coupled" elements. Coupling or connection between elements may be physical, may be logical or may be combination thereof. For example, "connection" may be read with "access".

In the present Description, in the case where two elements are connected, it is possible to consider that two elements are mutually "connected" or "coupled", by using one or more electric wires, cable and/or print electric connection, and as some non-limited and non-inclusive examples, electromagnetic energy having wavelengths in a radio frequency region, microwave region and/or light (both visible and invisible) region, or the like.

In the present Description, the terms of "A and B are different" may mean that "A and B are different from each other". The terms of "separate", "coupled" and the like may be similarly interpreted.

In the case of using "including", "comprising" and modifications thereof in the present Description or the scope of the claims, as in the term of "provided with", these terms are intended to be inclusive. Further, the term of "or" used in the present Description or the scope of the claims is intended to be not exclusive OR.

As described above, the present invention is described in detail, but it is obvious to a person skilled in the art that the invention is not limited to the Embodiment described in the present Description. The invention is capable of being carried into practice as modified and changed aspects without departing from the subject matter and scope of the invention defined based on the descriptions of the scope of the claims. Accordingly, the descriptions of the present Description are intended for illustrative explanation, and do not provide the invention with any restrictive meaning.

The invention claimed is:

1. A terminal comprising:
   a transmitter that transmits uplink data and uplink control information using an uplink shared channel; and
   a processor that controls a resource amount to perform rate matching processing or puncturing processing,
   wherein the processor controls the resource amount, to perform the rate matching processing or the puncturing processing, based on a number of bits of the uplink control information and an amount of the uplink data scheduled on the uplink shared channel, and
   when the uplink control information is HARQ-ACK, the processor selects one of the rate matching processing and the puncturing processing based on whether a payload of the HARQ-ACK exceeds a non-zero fixed value or is the non-zero fixed value or less.

2. The terminal according to claim 1, wherein the processor controls the resource amount, to perform the rate matching processing or the puncturing processing, based on the number of bits of the uplink control information, the amount of the uplink data, and a coding rate of the uplink control information.

3. A radio communication method for a terminal comprising:
   controlling a resource amount to perform rate matching processing or puncturing processing,
   wherein the controlling of the resource amount is performed based on a number of bits of uplink control information and an amount of uplink data scheduled on an uplink shared channel, and
   when the uplink control information is HARQ-ACK, selecting one of the rate matching processing and the puncturing processing based on whether a payload of the HARQ-ACK exceeds a non-zero fixed value or is the non-zero fixed value or less; and
   transmitting the uplink data and the uplink control information using the uplink shared channel.

4. A base station comprising:
   a processor that controls reception of an uplink shared channel in which a resource amount to perform rate matching processing or puncturing processing is controlled based on a number of bits of uplink control information and an amount of uplink data scheduled on the uplink shared channel,
   wherein, when the uplink control information is HARQ-ACK, the processor determines that one of the rate matching processing and the puncturing processing is to be selected based on whether a payload of the HARQ-ACK exceeds a non-zero fixed value or is the non-zero fixed value or less; and
   a receiver that receives the uplink data and the uplink control information transmitted using the uplink shared channel.

5. A system comprising a terminal and a base station, wherein
   the terminal comprises:
      a transmitter that transmits uplink data and uplink control information using an uplink shared channel; and
      a processor that controls a resource amount to perform rate matching processing or puncturing processing,
      wherein the processor controls the resource amount, to perform the rate matching processing or puncturing processing, based on a number of bits of the uplink control information and an amount of the uplink data scheduled on the uplink shared channel, and
      when the uplink control information is HARQ-ACK, the processor selects one of the rate matching processing and the puncturing processing based on whether a payload of the HARQ-ACK exceeds a non-zero fixed value or is the non-zero fixed value or less, and
   the base station comprises:
      a receiver that receives the uplink data and the uplink control information transmitted using the uplink shared channel.

* * * * *